United States Patent
Akl et al.

(10) Patent No.: US 11,937,163 B2
(45) Date of Patent: Mar. 19, 2024

(54) BAP CONFIGURATIONS FOR BACKHAUL ROUTING PATHS IN IAB

(71) Applicant: QUALCOMM Incorporated, San Diego, CA (US)

(72) Inventors: Naeem Akl, Somerville, NJ (US); Karl Georg Hampel, Hoboken, NJ (US); Navid Abedini, Basking Ridge, NJ (US); Jianghong Luo, Skillman, NJ (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 17/451,814

(22) Filed: Oct. 21, 2021

(65) Prior Publication Data

US 2022/0132390 A1 Apr. 28, 2022

Related U.S. Application Data

(60) Provisional application No. 63/104,488, filed on Oct. 22, 2020.

(51) Int. Cl.
*H04W 40/04* (2009.01)
*H04L 45/52* (2022.01)
*H04L 45/745* (2022.01)
*H04W 28/02* (2009.01)
*H04W 72/27* (2023.01)

(52) U.S. Cl.
CPC ............ *H04W 40/04* (2013.01); *H04L 45/52* (2013.01); *H04L 45/745* (2013.01); *H04W 28/0273* (2013.01); *H04W 72/27* (2023.01)

(58) Field of Classification Search
None
See application file for complete search history.

(56) References Cited

U.S. PATENT DOCUMENTS

2021/0127319 A1\* 4/2021 Huang .................... H04W 8/08
2023/0016871 A1\* 1/2023 Fujishiro ............... H04W 40/22

FOREIGN PATENT DOCUMENTS

WO 2020166912 A1 8/2020
WO 2020191768 A1 10/2020
WO WO-2021214378 A1 \* 10/2021 ............ H04W 92/20

OTHER PUBLICATIONS

International Search Report and Written Opinion—PCT/US2021/056350—ISA/EPO—dated Feb. 23, 2022.

\* cited by examiner

*Primary Examiner* — Anh Ngoc M Nguyen
(74) *Attorney, Agent, or Firm* — Procopio, Cory, Hargreaves & Savitch

(57) ABSTRACT

Aspects presented herein relate to methods and devices for wireless communication including an apparatus, e.g., a UE and/or a base station. In one aspect, the apparatus may send a request to a second BS to configure a backhaul routing path via the second BS to a third BS that has a signaling connection to the first BS. The apparatus may also communicate, with the second BS, a first backhaul adaptation protocol (BAP) configuration associated with the backhaul routing path. The apparatus may also transmit a second BAP configuration to the third BS in association with the communicated first BAP configuration.

28 Claims, 15 Drawing Sheets

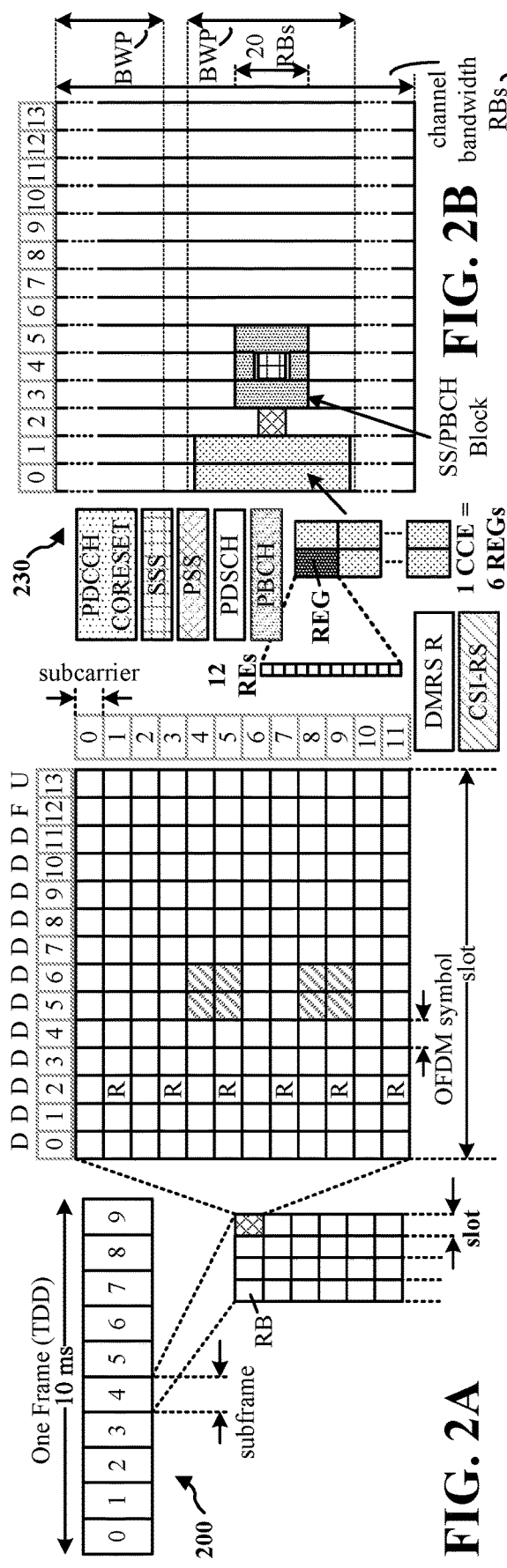
FIG. 2A
FIG. 2B
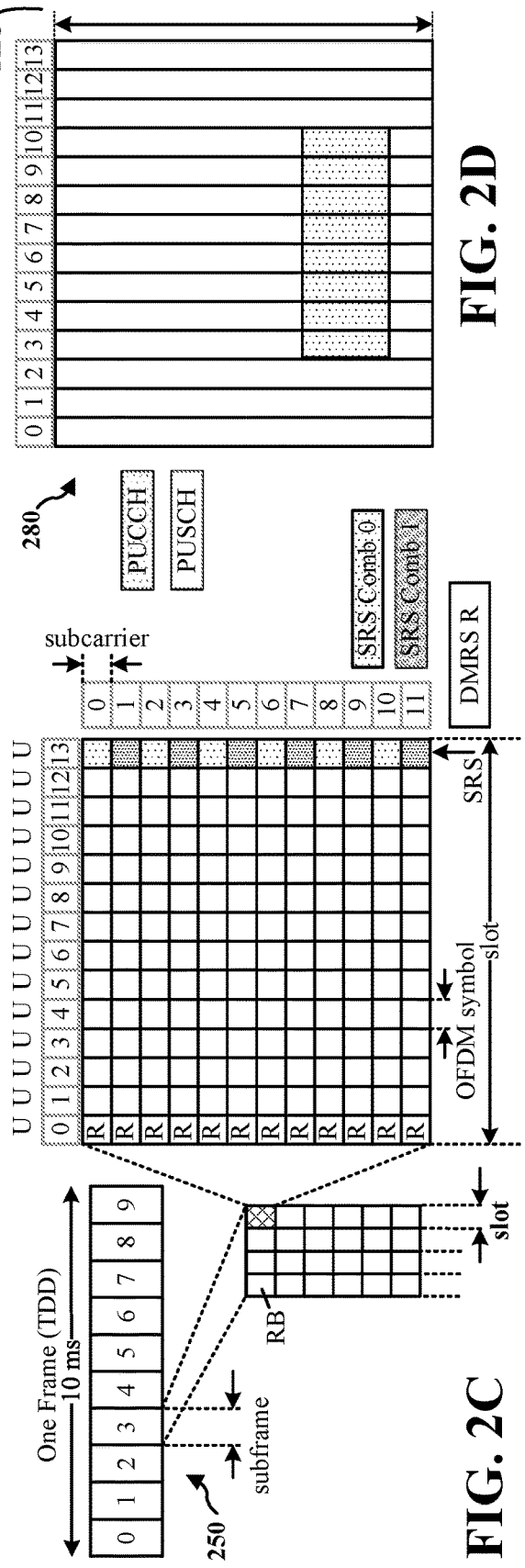
FIG. 2C
FIG. 2D

BAP CONFIGURATIONS FOR BACKHAUL ROUTING PATHS IN IAB

CROSS REFERENCE TO RELATED APPLICATION(S)

This application claims the benefit of and priority to U.S. Provisional Application Ser. No. 63/104,488, entitled "METHODS AND APPARATUS FOR BAP CONFIGURATIONS FOR BACKHAUL ROUTING PATHS IN TAB" and filed on Oct. 22, 2020, which is expressly incorporated by reference herein in its entirety.

TECHNICAL FIELD

The present disclosure relates generally to communication systems, and more particularly, to backhaul adaptation protocol (BAP) configurations in wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (MT)), and other requirements. 5G NR includes services associated with enhanced (pc) mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a base station (BS), e.g., a first BS. The apparatus may send a request to a second BS to configure a backhaul routing path via the second BS to a third BS that has a signaling connection to the first BS. The apparatus may also communicate, with the second BS, a first backhaul adaptation protocol (BAP) configuration associated with the backhaul routing path. The apparatus may also transmit a second BAP configuration to the third BS in association with the communicated first BAP configuration.

In another aspect of the disclosure, a method, a computer-readable medium, and an apparatus are provided. The apparatus may be a base station, e.g., a second BS. The apparatus may receive a request from a first BS to configure a backhaul routing path via the second BS to a third BS that has a signaling connection to the first BS. The apparatus may also communicate, with the first BS, a first backhaul adaptation protocol (BAP) configuration associated with the backhaul routing path. The apparatus may also transmit a packet for routing along the backhaul routing path to a third BS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
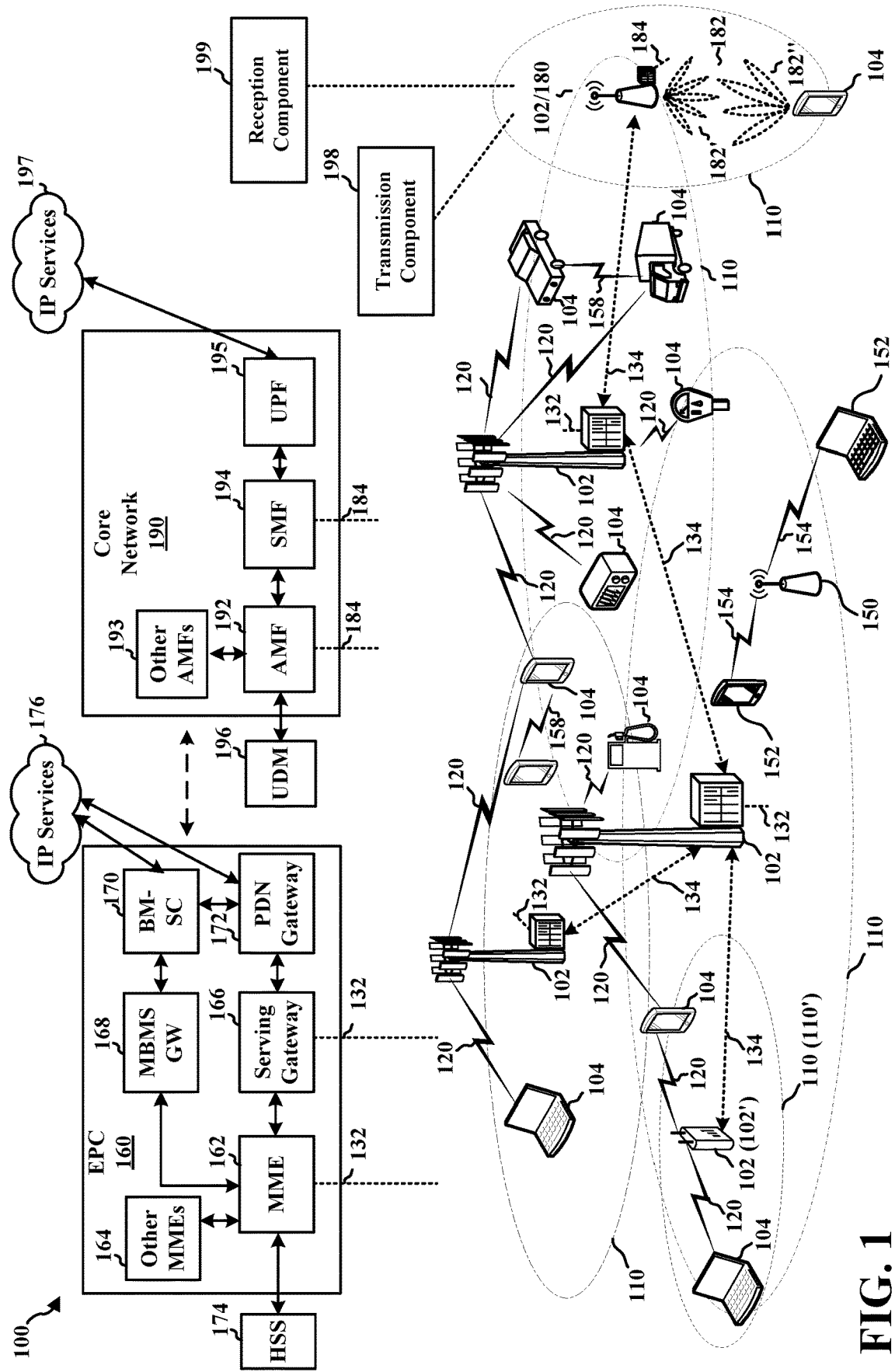
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may include a transmission component 198 configured to send a request to a second BS to configure a backhaul routing path via the second BS to a third BS that has a signaling connection to the first BS. Transmission component 198 may also be configured to communicate, with the second BS, a first backhaul adaptation protocol (BAP) configuration associated with the backhaul routing path. Transmission component 198 may also be configured to transmit a second BAP configuration to the third BS in association with the communicated first BAP configuration.

Referring again to FIG. 1, in certain aspects, the base station 180 may include a reception component 199 configured to receive a request from a first BS to configure a backhaul routing path via the second BS to a third BS that has a signaling connection to the first BS. Reception component 199 may also be configured to communicate, with the first BS, a first backhaul adaptation protocol (BAP) configuration associated with the backhaul routing path. Reception component 199 may also be configured to transmit a packet for routing along the backhaul routing path to a third B S.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
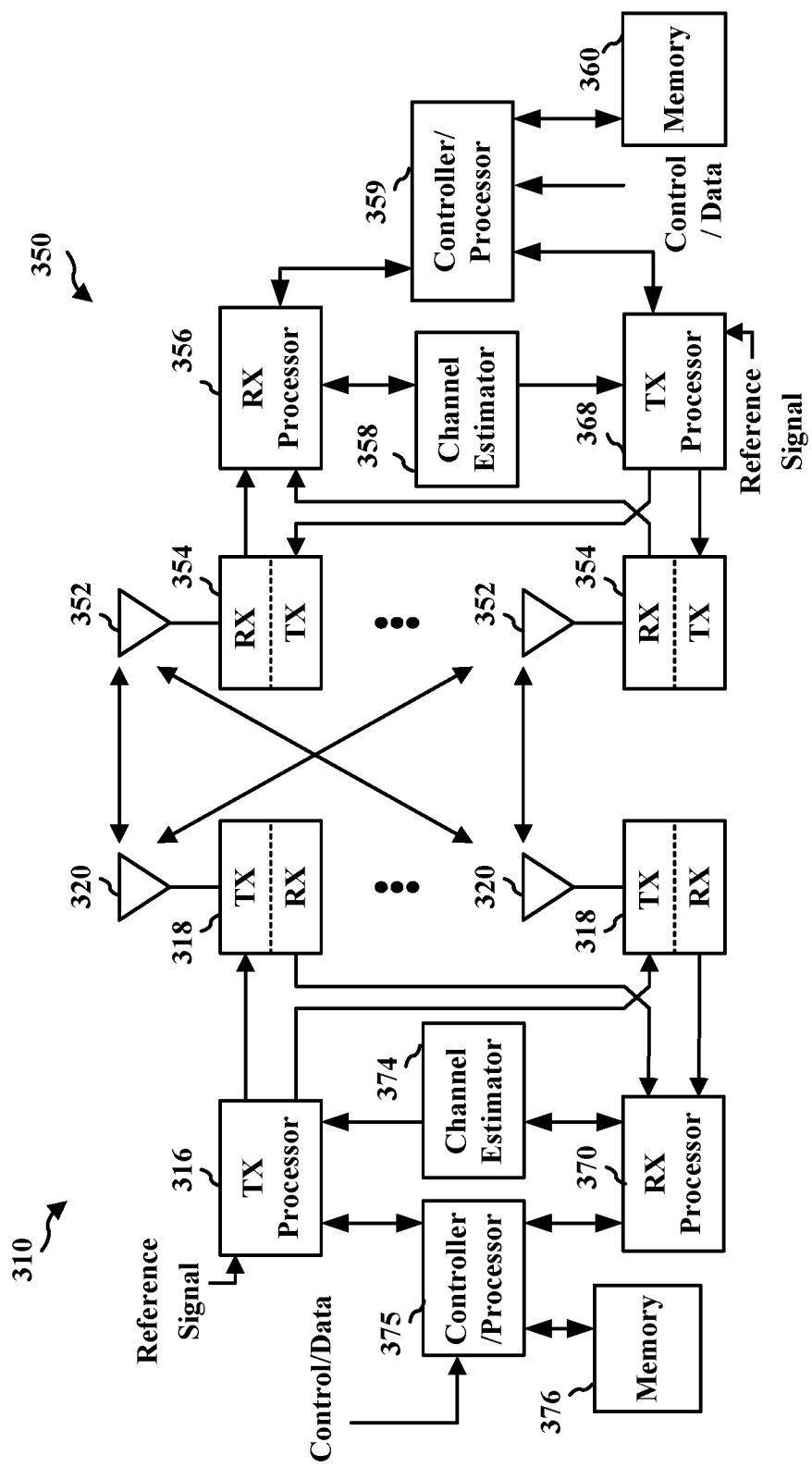
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
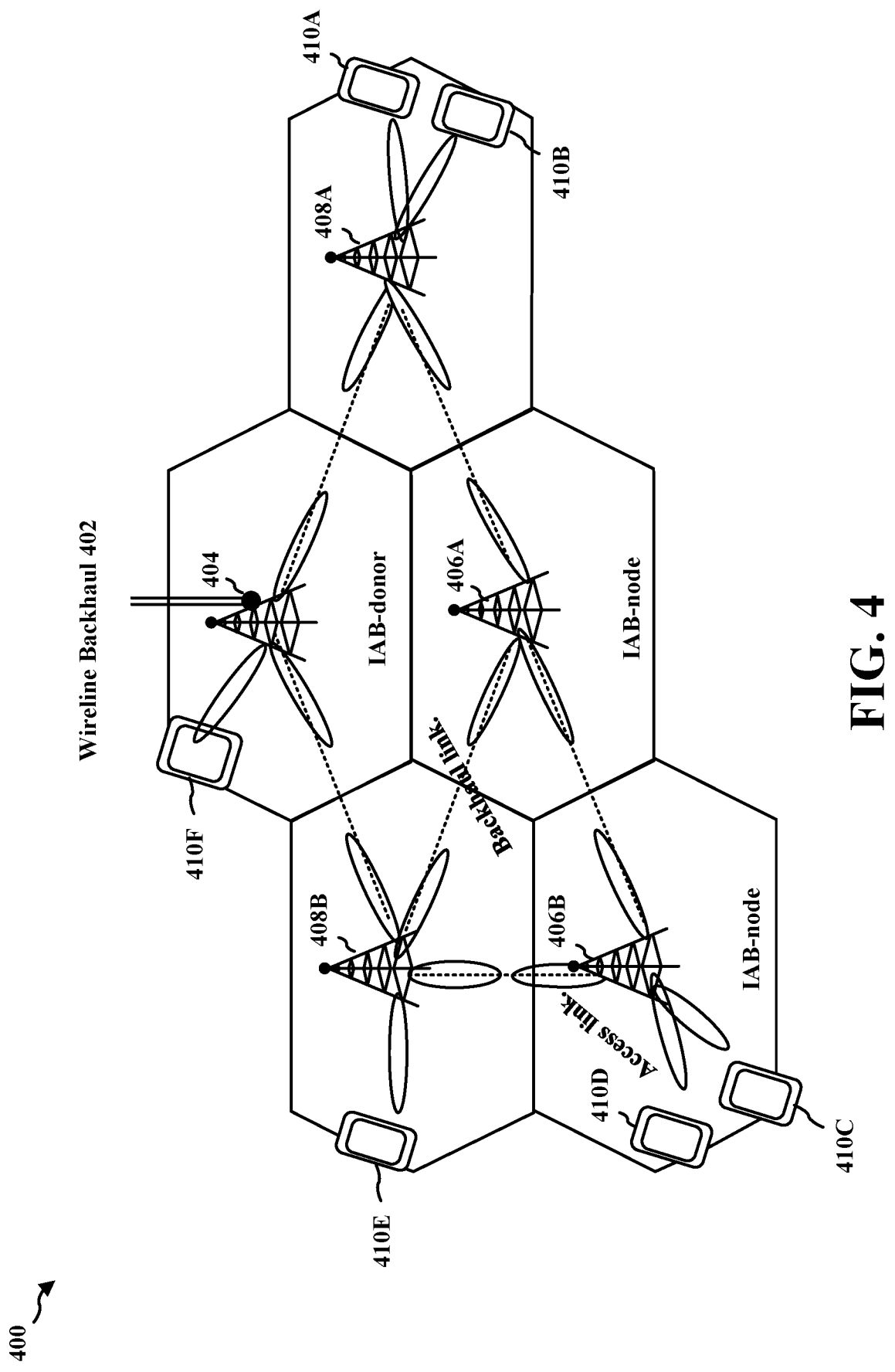
FIG. 4 is a diagram illustrating an example integrated access and backhaul (IAB) network.

FIG. 4 is a diagram illustrating an IAB network 400. The IAB network 400 may provide access network functionality between access nodes (ANs) 404, 406A, 406B, 408A, 408B and ANs/UEs 410A, 410B, 410C, 410D, 410E, and 410F, and backhaul network functionality between the ANs. The ANs may include an IAB-donor 404, which has a wireline connection to the core network 402, and IAB-nodes 406A and 406B, which operate wirelessly and relay traffic to/from IAB-donors through one or more AN hops 408A and 408B. The IAB ANs may share resources between the access and backhaul. That is, the resources used for access communication between the ANs and ANs/UEs may also be used for backhaul communication between the ANs.

Figure 5:
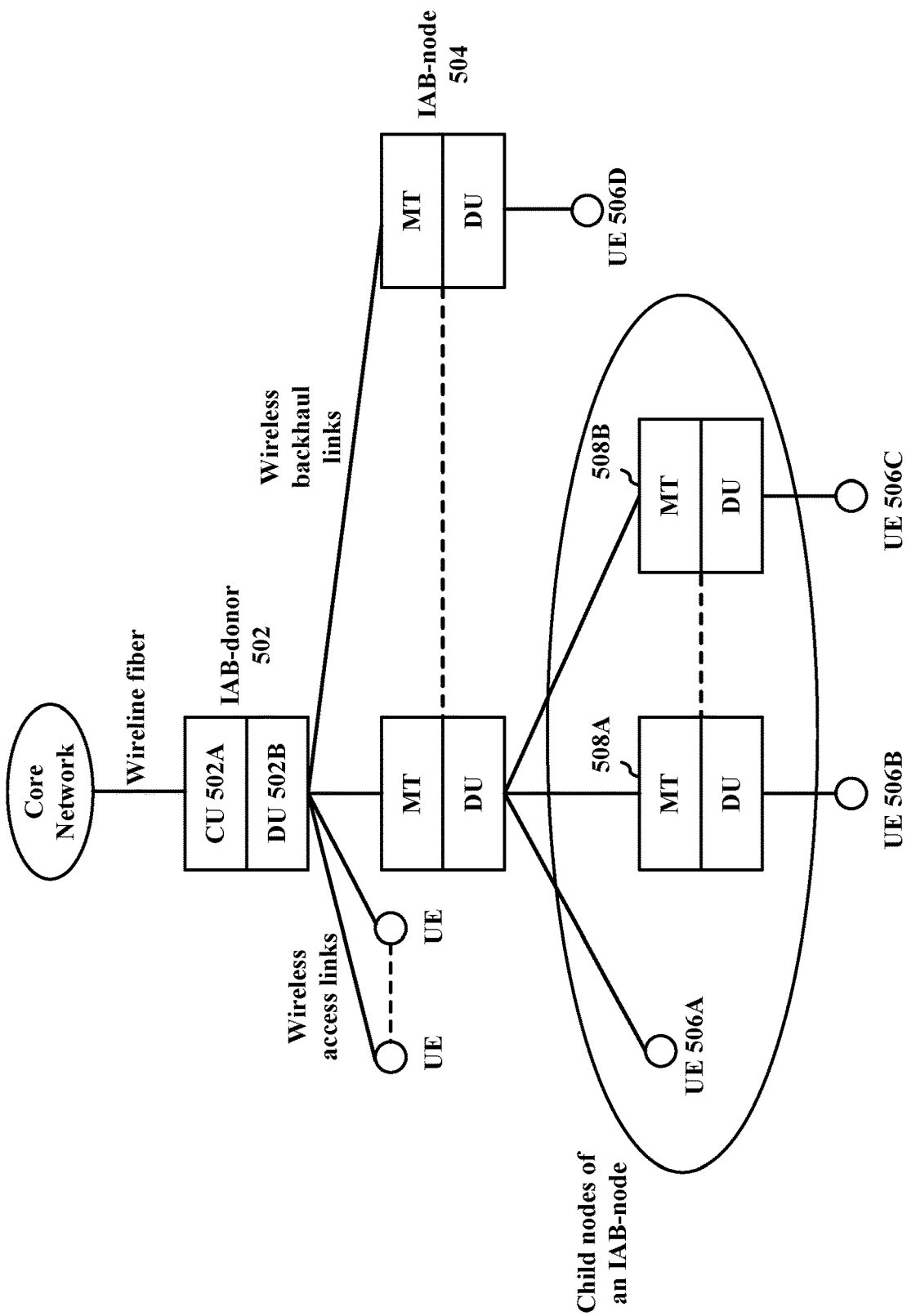
FIG. 5 is a diagram illustrating an example IAB network.

FIG. 5 is a diagram illustrating an IAB network 500. In an IAB network, there may be two types of BSs: IAB-donors (e.g., IAB-donor 502) and IAB-nodes (e.g., IAB-node 504). IAB-donors are enhanced base stations with functions to control the IAB network. IAB-donors include a central unit (CU) (e.g., CU 502A) that controls the entire IAB network through configuration. The CU holds RRC and packet data convergence protocol (PDCP) layer functions. The IAB-donors may further include a distributed unit (DU) (e.g., DU 502B) that schedules child nodes (e.g., UEs 506A, 506B, 506C, 506D and/or ANs 508A, 508B) of the IAB-donor. The DU may hold radio link control (RLC), media access control (MAC), a physical (PHY) layer functions. The IAB-node 504 may be a layer 2 (L2) relay node that includes mobile termination (MT) and DU functions. The MT may be scheduled (similar to a UE) by its parent IAB-node or IAB-donor. The DU may schedule child nodes (UEs and/or ANs) of the IAB-node.

Figure 6:
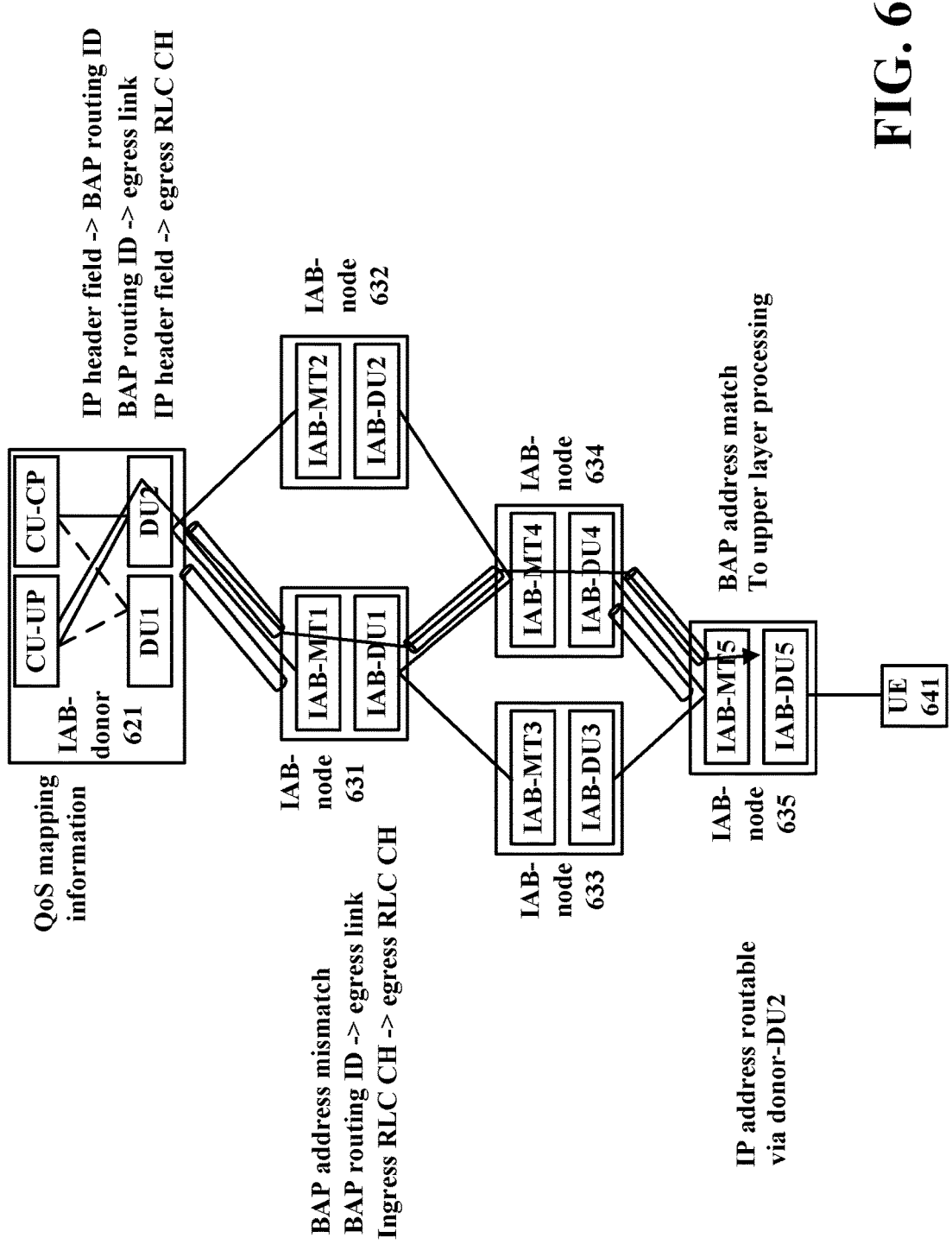
FIG. 6 is a diagram illustrating an example internet protocol (IP)/BAP configuration.

FIG. 6 is a diagram illustrating IP/BAP configuration 600. More specifically, FIG. 6 illustrates a downlink (DL) packet processing of IP/BAP configuration 600. FIG. 6 includes IAB-donor 621, IAB-node 631, IAB-node 632, IAB-node 633, IAB-node 634, IAB-node 635, and UE 641. For the DL packet processing, the IAB-donor-CU-UP of IAB-donor 621 may insert an IP packet with QoS mapping information, which includes a differentiated services codepoint (DSCP) and an IP flow label. Based on the QoS mapping information, the IAB-donor-CU-CP may configure a routing path for a downlink mapping at the IAB-donor-DU. When the IAB-donor-DU receives an IP packet, the IAB-donor-DU may then decide how to route the traffic based on the IP header and the downlink mapping configuration. The downlink mapping configuration indicates a mapping between the IP header fields (e.g., destination IP address, DCSP, and IPv6 flow label) and a BAP routing ID. The IAB-donor-DU inserts a BAP header to the packet that carries the BAP routing ID. The IAB-donor-DU further may determine based on a routing configuration a mapping between the BAP routing ID and an egress link along which the IAB-donor-DU forwards the BAP packet. The IAB-donor-DU may further determine an egress RLC channel based on the IP header and the downlink mapping configuration. The IAB-donor-DU may transmit the BAP packet to the IAB-node 631. The IAB-node 631 may determine that the BAP address, which may be part of the BAP routing ID and carried in the BAP header, does not match its own BAP address (i.e., there is a BAP address mismatch), and based on the BAP routing ID and a routing configuration, the IAB-node 631 may determine the egress link for transmitting the BAP packet. Based on the ingress RLC channel and a channel mapping configuration, the IAB-node 631 may determine the egress RLC channel. The IAB-node 631 may then transmit the IP packet through the determined link and the egress RLC channel to the IAB-node 634. The same process may be followed for IAB-node 634 and IAB-node 635, where IAB-node 635 may determine a BAP address match, remove the BAP header, and forward the IP packet to upper layer processing for transmission to UE 641.

Figure 7:
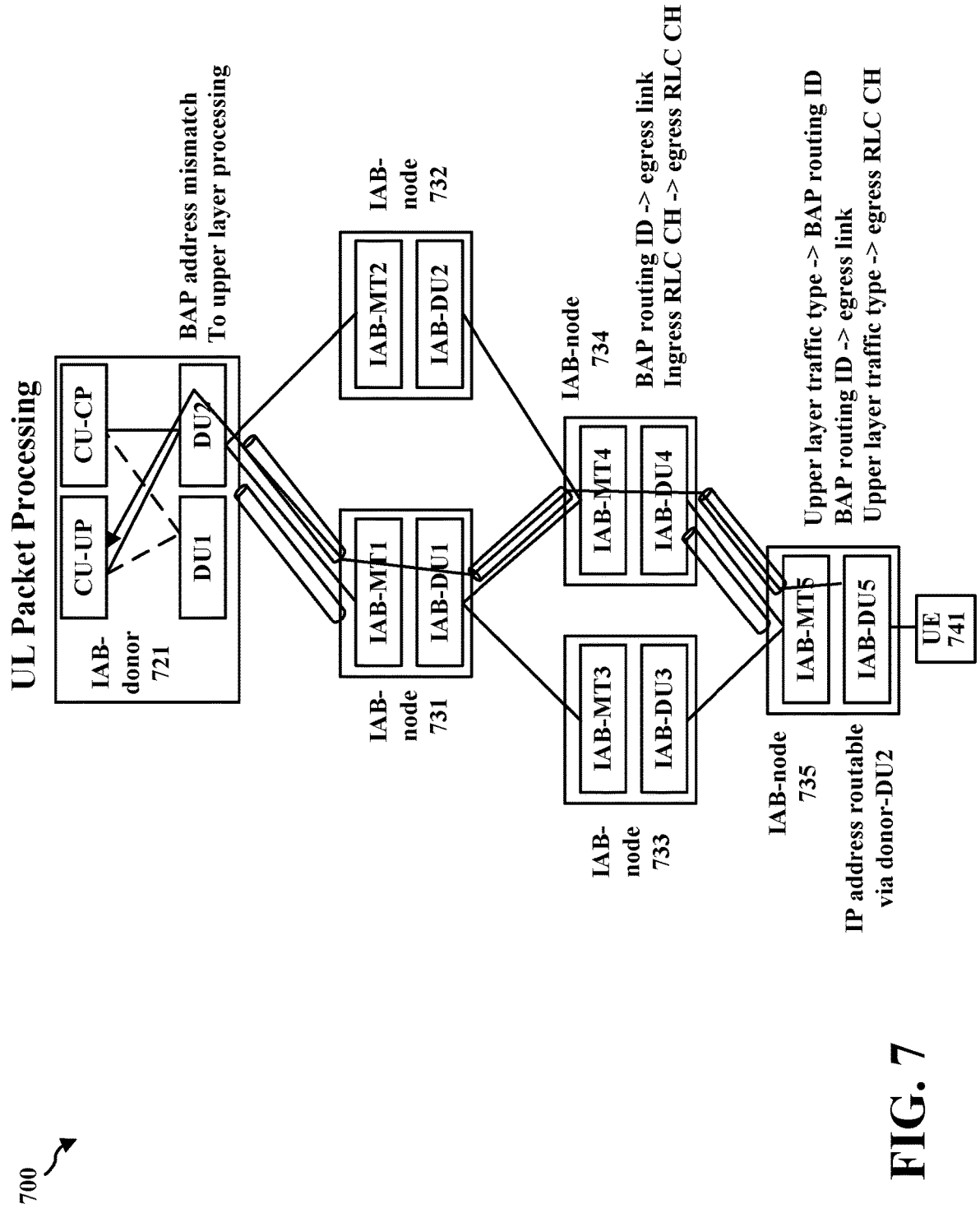
FIG. 7 is a diagram illustrating an example IP/BAP configuration.

FIG. 7 is a diagram illustrating IP/BAP configuration 700. More specifically, FIG. 7 illustrates uplink (UL) packet processing of IP/BAP configuration 700. FIG. 7 includes IAB-donor 721, IAB-node 731, IAB-node 732, IAB-node 733, IAB-node 734, IAB-node 735, and UE 741. For the UL packet processing, based on the traffic type and an uplink mapping configuration, the IAB-node 735 may determine a BAP routing ID, and may insert into a BAP header the BAP routing ID. Based on the BAP routing ID and a routing configuration, the IAB-node 735 may determine an egress link, and based on the traffic type, may determine an egress RLC channel. The IAB-node 735 may transmit the IP packet to the IAB-node 734 based on the determined egress link and egress RLC channel. The IAB-node 734 may determine the egress link based on the BAP routing ID and a routing configuration, and based on the ingress RLC channel and a channel mapping configuration, may determine the egress RLC channel. The IAB-node 734 may transmit the BAP packet to the IAB-node 731 based on the determined egress link and egress RLC channel. The same process may be followed by IAB-node 731, and the IP packet may ultimately be received and processed by the IAB-donor 721, where there may be a BAP address match.

Figure 8:
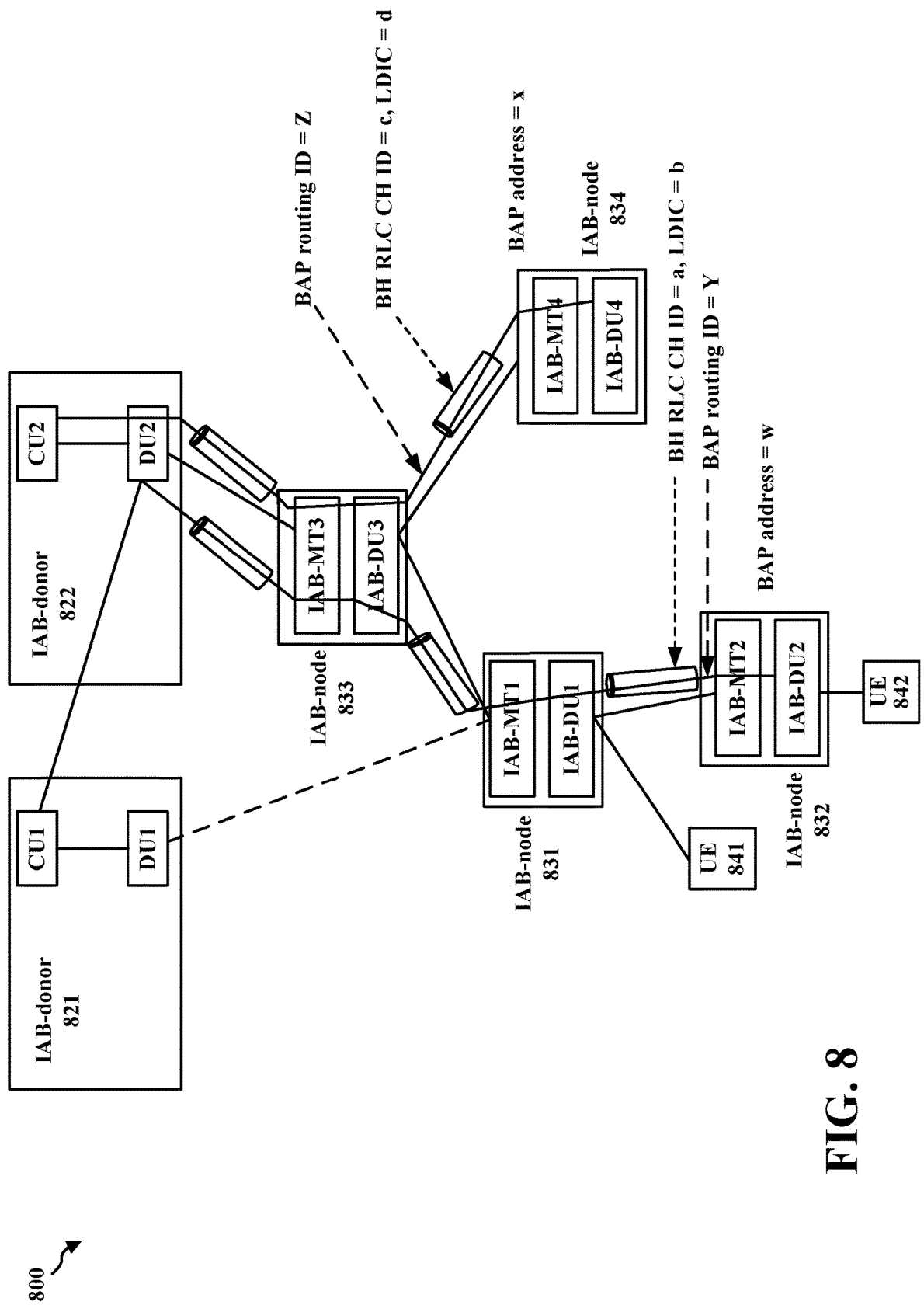
FIG. 8 is a diagram illustrating an example BAP configuration.

FIG. 8 is a diagram illustrating BAP configuration 800. As shown in FIG. 8, BAP configuration 800 includes IAB-donor 821, IAB-donor 822, IAB-node 831, IAB-node 832, IAB-node 833, IAB-node 834, UE 841, and UE 842. As depicted in FIG. 8, an IAB-node may be connected to one or more IAB-donors. For example, as shown in FIG. 8, IAB-node 831 may be dual-connected to IAB-donor 821, e.g., CU1, and IAB-donor 822, e.g., CU2. IAB-node 832 may also be connected to IAB-donor 821, e.g., CU1. Moreover, IAB-node 833 may be connected to IAB-donor 822, e.g., CU2. In some aspects, IAB-donor 821, e.g., CU1, may want to route F1-U traffic over a secondary path via a donor-DU associated with IAB-donor 822 or CU2. For instance, by doing so, the IAB-donor 822 or CU1 may attempt to achieve load-balancing or redundancy.

As further shown in FIG. 8, a BAP routing ID between IAB-donor-DU2 of IAB-donor 822 and IAB-node 834 may be equal to 'Z.' Also, between IAB-node 833 and IAB-node 834, a backhaul (BH) radio link control (RLC) channel (CH) identifier (ID) may be equal to 'c' and an LCID may be equal to 'd.' The BAP address at IAB-node 834 may be equal to 'x.' Moreover, the BAP route that includes at least IAB-node 831 and IAB-node 832 has a BAP routing ID equal to 'Y.' This BAP route may break at IAB-node 831 or extend up to IAB-donor-DU2 and include IAB-node 833. Further, between IAB-node 831 and IAB-node 832, a BH RLC CH ID may be equal to 'a' and an LCID may be equal to 'b.' The BAP address at IAB-node 832 may be equal to 'w'.

In some aspects, a routing configuration and/or a channel mapping configuration may be needed at IAB-node 831. Further, sharing transport IDs may be utilized between IAB-donor 821, e.g., CU1, and IAB-donor 822, e.g., CU2. For example, the transport IDs may correspond to a BAP routing space, a backhaul (BH) radio link control (RLC) channel space, and/or a logical channel ID (LCID) space. There may also be a similar scenario in a topology adaptation.

Based on the above, it may be beneficial to provide a BAP configuration for a backhaul routing path in an IAB network. For instance, it may be beneficial to include a routing configuration and/or a channel mapping configuration at an IAB node. Accordingly, it may be beneficial to share transport IDs between IAB donors, e.g., multiple CUs.

Aspects of the present disclosure may include a BAP configuration for a backhaul routing path in an IAB network. For instance, aspects of the present disclosure may include a routing configuration and/or a channel mapping configuration at an IAB node. As such, aspects of the present disclosure may share transport IDs between IAB donors, e.g., multiple CUs.

FIG. 8 shows an example of a backhaul routing path that carries traffic between donor-CU1 and IAB-node 832 and includes along the path donor-DU2, IAB-node 833, and IAB-node 831. Thus, the backhaul routing path extends over topology sections that may be managed by different CUs. For instance, CU1 may manage the backhaul transport for the topology section to the southbound of IAB-node 831 (e.g., between IAB-node 831 and IAB-node 832). Also, CU2 may manage the backhaul transport for the topology section to the northbound of IAB-node 831 (e.g., between IAB-node 831 and IAB-node 833 or between IAB-node 833 and donor-DU2). This may result in the exchange of a BAP configuration between the two CUs to achieve inter-domain BAP routing. In one example, a single BAP routing ID may be configured for the path that extends over the two topology sections. This BAP routing ID may be selected by either CU1 or CU2. If CU1 selects the BAP routing ID, CU2 may configure routing and mapping configurations at the section managed by CU2 (e.g., routing configuration at IAB-node 833 or routing configuration or downlink mapping configuration at donor-DU2) for the selected BAP routing ID, which may imply CU1 and CU2 may exchange the BAP routing ID. If CU2 selects the BAP routing ID, CU2 may indicate the routing ID to CU1 so that CU1 may configure an uplink mapping configuration for the selected routing ID at IAB-node 832. CU1 and CU2 may further negotiate the BAP routing ID. This is because if CU1 selects a BAP routing ID, this may conflict with a BAP routing ID configured by CU2 for a BAP route in the topology managed by CU2. The BAP routing ID may also carry a destination BAP address that collides with a BAP address allocated by CU2 for a node within the topology managed by CU2. Similar issues may occur if CU2 selects the BAP routing ID. Therefore, one of the two CUs, e.g., CU1, may send to the other CU, e.g., CU2, an indication of available BAP routing IDs at the CU, e.g., CU1, and the other CU, e.g., CU2, may make a selection. CU1 may also send a list of available BAP addresses or BAP path IDs. CU1 may also request a BAP routing ID, BAP address, or BAP path ID from CU2. Based on the selected BAP routing ID or BAP address, CU1 may configure an additional BAP address or modify a BAP address for an IAB-node, e.g., IAB-node 832. Similarly, CU2 may configure an additional BAP address or modify a BAP address for donor-DU2 of IAB-donor 822. The BAP routing ID may be for a BAP route in uplink or downlink.

In one example, CU1 may allocate IP address information to IAB-node 832 such that IAB-node 832 is IP-routable via IAB-donor-DU2. In this case, CU1 may provide a BAP address for the donor-DU associated with the allocated IP information. This BAP address may be for donor-DU2 and may be exchanged between CU1 and CU2. In one example, two separate BAP routing IDs may be used for each portion of the backhaul routing path that extends over the two topology sections of FIG. 8: one for the portion between IAB-node 831 and IAB-node 832, and another for the portion between IAB-node 831 and IAB-donor-DU2. Thus, the routing ID may be rewritten for packets that cross the two topology sections along the routing path between donor- DU2 and IAB-node 832. These routing IDs may be exchanged between CU1 and CU2. In one example, CU1 may establish a BH RLC CH (e.g., the CH with ID='a') between IAB-node 831 and IAB-node 832. CU2 may establish a BH RLC CH between IAB-node 831 and IAB-node 833. Traffic that is received by IAB-node 831 along the backhaul routing path over one of the two example BH RLC CHs may be mapped to the other CH. A channel mapping configuration at IAB-node 831 may be configured by either of the two CUs, and this may utilize knowledge of the BH RLC CH established by the other CU. The two CUs may exchange a CH ID such as a BH RLC CH ID or LCD for the channel. Other examples of a BAP configuration exchange may apply between CU1 and CU2. A similar scenario may occur in topology adaptation, where in one example MT1 may be initially connected to donor-DU1 of FIG. 8, and then switch parents to IAB-node 833. Any of the child/descendant UEs/MTs of IAB-node 831 may still not have migrated to the second donor, in which case inter-domain BAP routing may again be utilized, so a BAP configuration may be exchanged between the two CUs.

In some aspects of the present disclosure, a first IAB-donor-CU may send a request to a second IAB-donor-CU to configure a backhaul routing path via a donor-DU associated with the second IAB-donor-CU and an IAB node that has a signaling connection with the first IAB-donor-CU. The first IAB-donor-CU may also communicate a first BAP configuration associated with the backhaul routing path with the second IAB-donor-CU. Further, a first IAB-donor-CU may provide a second configuration to the IAB-node based on the first BAP configuration.

Aspects of the present disclosure may also include a second IAB-donor-CU that may receive a request from a first IAB-donor-CU to configure a backhaul routing path via a donor-DU associated with the second IAB-donor-CU and an IAB-node that has a signaling connection with the first IAB-donor-CU. The second IAB-donor-CU may also communicate a first BAP configuration associated with the backhaul routing path with the first IAB-donor-CU. Also, the second IAB-donor-CU may provide a second configuration to an IAB-node on the backhaul routing path based on the first BAP configuration.

In some aspects of the present disclosure, the backhaul routing path may include a chain of at least one BH RLC CH between the donor-DU and the IAB-node. Also, the signaling connection may be RRC or F1 control plane (F1-C). The IAB-node may have a second signaling connection with the second IAB-donor-CU. Additionally, the second signaling connection may be RRC or F1-C.

In some instances, the backhaul routing path may carry control plane traffic, e.g., F1-C traffic. The backhaul routing path may also carry user plane traffic, e.g., F1 user plane (F1-U) traffic. Moreover, the backhaul routing path may carry non-F1 traffic. The backhaul routing path may also carry traffic for a child UE or child IAB-node MT of the IAB-node. The backhaul routing path may also carry traffic for a descendant UE or a descendant IAB-node MT of the IAB node.

In some aspects of the present disclosure, a first IAB-donor-CU may send at least part of the first BAP configuration to the second IAB-donor-CU. The second IAB-donor-CU may send at least part of the first BAP configuration to the first IAB-donor-CU. Additionally, the first BAP configuration may include a BAP routing ID of the backhaul routing path. The first BAP configuration may also include a BAP path ID of the backhaul routing path.

Further, the first BAP configuration may include a BAP address of the IAB-node. The first BAP configuration may include a BAP address of a parent node of the IAB-node on the backhaul routing path. The first BAP configuration may also include a BAP address of the donor-DU on the backhaul routing path. The first BAP configuration may also include a BH RLC CH ID of a BH RLC CH between the IAB-node and a parent node of the IAB-node on the backhaul routing path. The first BAP configuration may also include an LCID of a BH RLC CH between the IAB-node and a parent node of the IAB-node on the backhaul routing path. The first BAP configuration may be uplink-specific, downlink-specific, and/or bidirectional.

In some instances, the second configuration may include an uplink mapping to a BAP routing ID of the first BAP configuration. The second configuration may include an uplink mapping to an egress BH RLC CH with a BH RLC CH ID or an LCID of the first BAP configuration. The second configuration may include a routing configuration of a BAP routing ID of the first BAP configuration to an egress link. The second configuration may include a routing configuration to a next-hop BAP address of the first BAP configuration for a parent node of the IAB-node on the backhaul routing path.

Additionally, the second configuration may include a BH RLC CH mapping configuration from an ingress BH RLC CH with a BH RLC CH ID or an LCID of the first BAP configuration to an egress BH RLC CH. The second configuration may include a BH RLC CH mapping configuration from an ingress BH RLC CH to an egress BH RLC CH with a BH RLC CH ID or an LCID of the first BAP configuration. The second configuration may also include a downlink mapping to a BAP routing ID of the first BAP configuration. The second configuration may include a downlink mapping to an egress BH RLC CH with a BH RLC CH ID or an LCID of the first BAP configuration. Moreover, the second configuration may include an allocation of IP address information to the IAB-node along with the BAP address of the first BAP configuration for the donor-DU on the BH routing path.

In some instances, aspects of the present disclosure may utilize inter-donor topology redundancy, such as with the principle that an IAB-DU has an F1 interface with one donor CU. For example, the IAB node may be multi-connected with two donors. The IAB node's parent/ancestor node may also be multi-connected with two donors. Additionally, one inter-donor topology transport mechanism may be defined for scenarios where traffic between a donor and an IAB DU traverses the network under another donor. A common signaling design may be achieved for each of the scenarios. For an IAB-MT with simultaneous connectivity to two IAB-donors, it may keep its collocated IAB-DU and all UEs and descendent nodes at donor 1 while routing the F1-U connections via a top-level migrating IAB-MT's link with donor 2. In some aspects, when the IAB-node performs radio link failure (RLF) recovery via an RRC reestablishment procedure at a new IAB-donor-CU, ongoing F1 transport connections of the IAB-node and its descendent nodes with the original donor may be retained and rerouted via the recovered path. For the recovery of RLF occurring on one link for an IAB-MT with simultaneous inter-donor connectivity, all traffic may be rerouted to the other path without a need for IAB-DU migration. Further, a boundary IAB node may be an IAB node whose IAB-DU is terminated to a different IAB-donor-CU than a parent DU. Also, to support bearer mapping across two topologies at the boundary IAB node, the non-F1-termination donor CU may provide the ingress BH RLC CH ID(s) for downlink traffic and egress BH RLC CH ID(s) for uplink traffic to the F1-termination donor CU.

Figure 9:
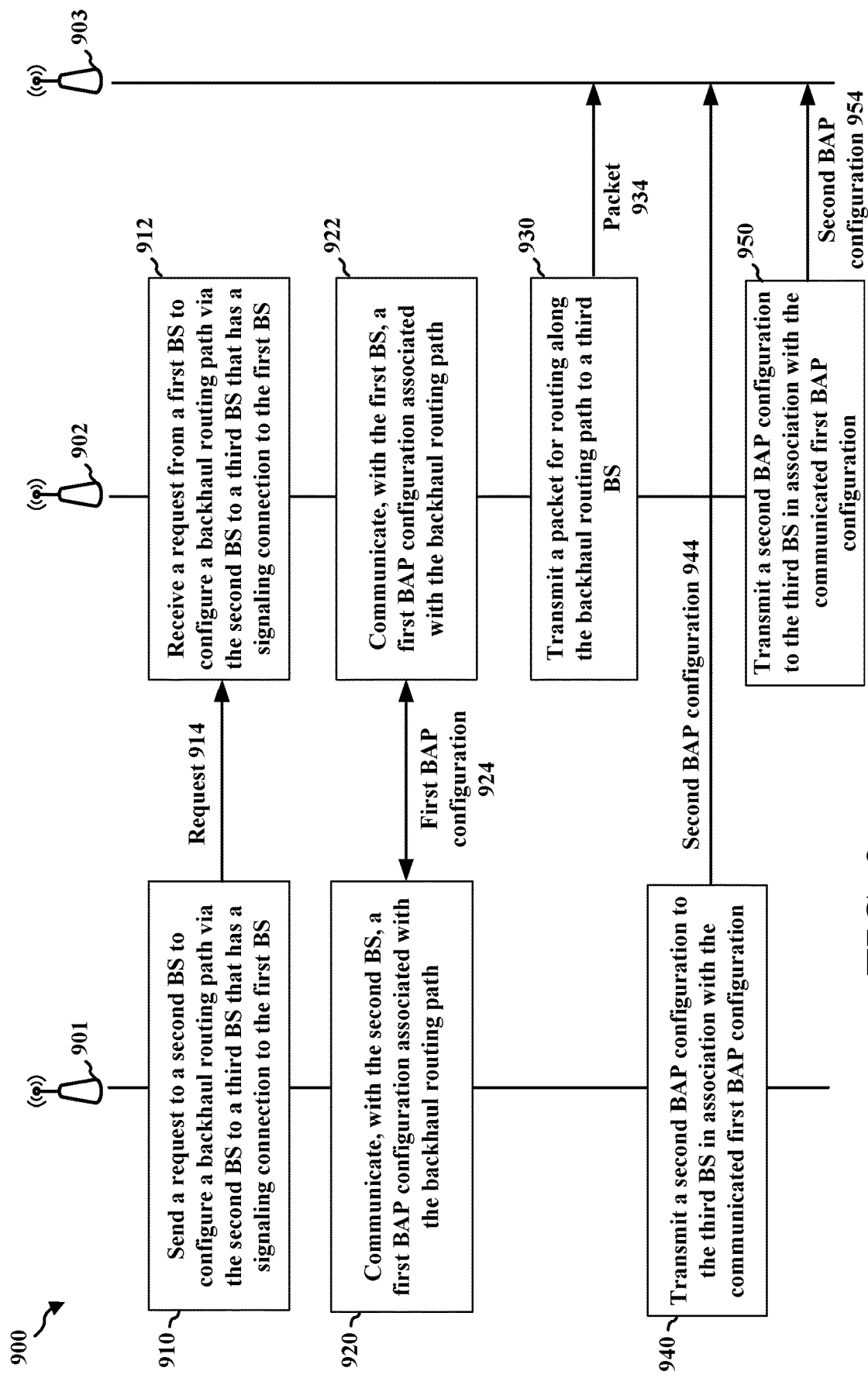
FIG. 9 is a diagram illustrating example communication between base stations.

FIG. 9 is a diagram 900 illustrating example communication between a base station 901, a base station 902, and a base station 903.

At 910, base station 901 may send a request, e.g., request 914, to a second BS, e.g., base station 902, to configure a backhaul routing path via the second BS to a third BS, e.g., base station 903, that has a signaling connection to the first BS. At 912, base station 902 may receive a request, e.g., request 914, from a first BS, e.g., base station 901, to configure a backhaul routing path via the second BS to a third BS, e.g., base station 903, that has a signaling connection to the first BS.

In some aspects, the backhaul routing path may include a chain of at least one backhaul radio link control (RLC) channel between the second BS and the third BS. The backhaul routing path may carry at least one F1 control-plane (F1-C) traffic, F1 user-plane (F1-U) traffic, or non-F1 traffic. The backhaul routing path may also carry traffic for a child user equipment (UE) of the third BS or a child integrated access backhaul (IAB) node mobile termination (MT) of the third BS. Also, the backhaul routing path may carry traffic for a descendant user equipment (UE) of the third BS or a descendant integrated access backhaul (IAB) node mobile termination (MT) of the third BS.

Additionally, the signaling connection may include at least one of a radio resource control (RRC) signaling connection, or a F1 control plane (F1-C) signaling connection. The third BS may have a second signaling connection with the second BS. The second signaling connection may include at least one of a radio resource control (RRC) signaling connection, or a F1 control plane (F1-C) signaling connection.

At 920, base station 901 may communicate, with the second BS, e.g., base station 902, a first backhaul adaptation protocol (BAP) configuration, e.g., first BAP configuration 924, associated with the backhaul routing path. In some aspects, the communicating, with the second BS, the first BAP configuration associated with the backhaul routing path may include at least one of: transmitting at least a first part of the first BAP configuration to the second BS; or receiving at least a second part of the first BAP configuration from the second BS. At 922, base station 902 may communicate, with the first BS, e.g., base station 901, a first BAP configuration, e.g., first BAP configuration 924, associated with the backhaul routing path. In some instances, the communicating, with the first BS, the first BAP configuration associated with the backhaul routing path may include at least one of: receiving at least a first part of the first BAP configuration from the first BS; or transmitting at least a second part of the first BAP configuration to the first BS. Transmitting at least a part of the first BAP configuration to the second BS may be associated with sharing quality of service (QoS) information of traffic to be offloaded from CU1 to CU2.

In some aspects, the first BAP configuration may include at least one of a BAP routing identifier (ID) of the backhaul routing path, a BAP path ID of the backhaul routing path, a BAP address of the third BS, a BAP address of a parent node of the third BS on the backhaul routing path, a BAP address of the second BS on the backhaul routing path, a backhaul radio link control (RLC) channel ID of a backhaul RLC channel between the third BS and the parent node of the third BS on the backhaul routing path, or a logical channel ID (LCID) of the backhaul RLC channel between the third BS and the parent node of the third BS on the backhaul routing path. Moreover, the first BAP configuration may be uplink specific, downlink specific, or bidirectional.

At 930, base station 902 may transmit a packet, e.g., packet 934, for routing along the backhaul routing path to a third BS, e.g., base station 903.

At 940, base station 901 may transmit a second BAP configuration, e.g., second BAP configuration 944, to the third BS, e.g., base station 903, in association with the communicated first BAP configuration. In some instances, the second BAP configuration may include at least one of: an uplink mapping to a BAP routing identifier (ID) of the first BAP configuration; an uplink mapping to an egress backhaul radio link control (RLC) channel with a backhaul RLC channel ID or logical channel ID (LCID) of the first BAP configuration; a routing configuration of the BAP routing ID of the first BAP configuration to an egress link; a routing configuration to a next-hop BAP address of the first BAP configuration for a parent node of the third BS on the backhaul routing path; a backhaul RLC channel mapping configuration from an ingress backhaul RLC channel with the backhaul RLC channel ID or the LCID of the first BAP configuration to the egress backhaul RLC channel; a backhaul RLC channel mapping configuration from the ingress backhaul RLC channel to the egress backhaul RLC channel with the backhaul RLC channel ID or the LCID of the first BAP configuration; a downlink mapping to the BAP routing ID of the first BAP configuration; a downlink mapping to the egress backhaul RLC channel with the backhaul RLC channel ID or the LCID of the first BAP configuration; or an allocation of Internet protocol (IP) address information to the third BS and a BAP address of the first BAP configuration for the second BS on the backhaul routing path. The backhaul RLC channel mapping configuration may be referred to as bearer mapping at the boundary node.

At 950, base station 902 may transmit, to the third BS (e.g., base station 903) or at least one other BS on the backhaul routing path, a second BAP configuration, e.g., second BAP configuration 954, in association with the communicated first BAP configuration. The second BAP configuration may also be transmitted to another BS on the backhaul routing path.

Figure 10:
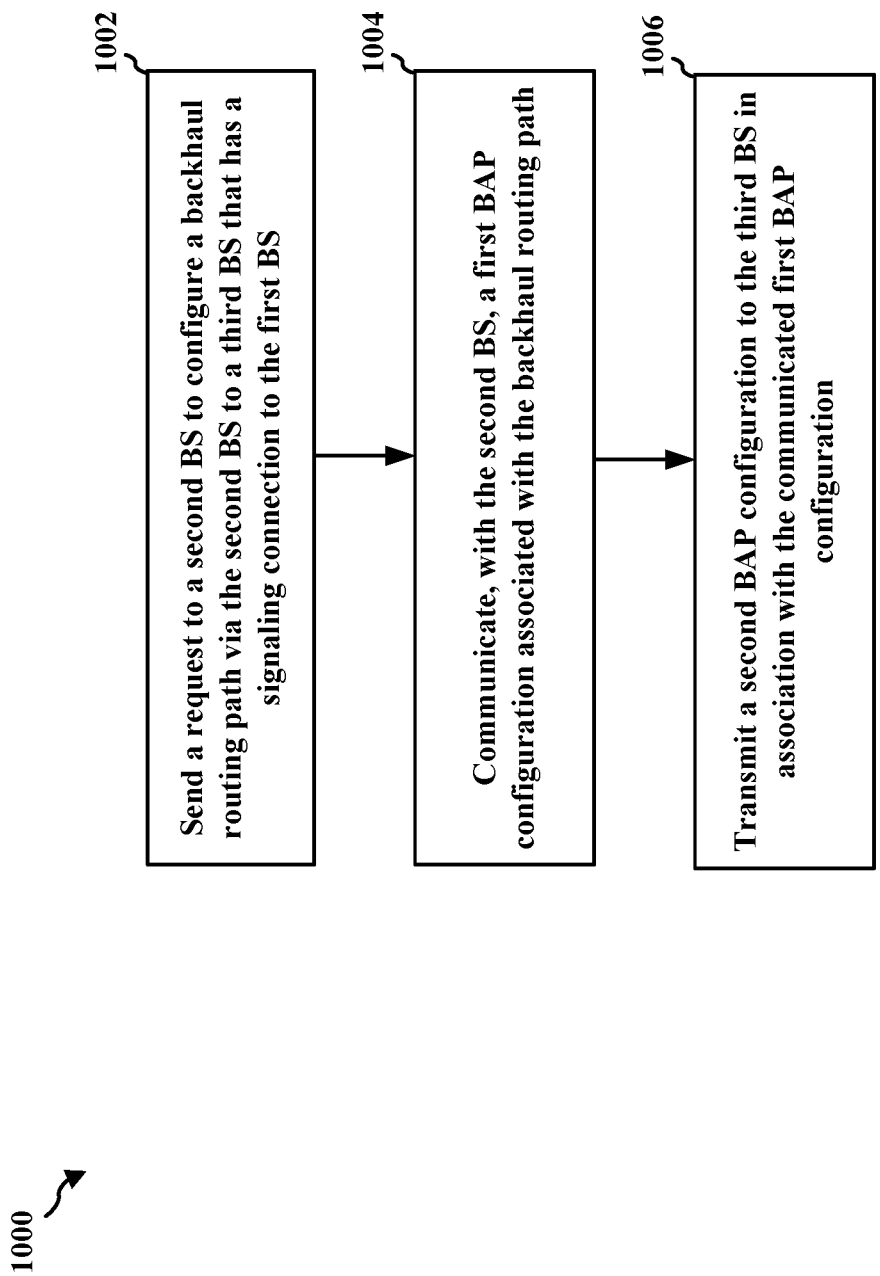
FIG. 10 is a flowchart of a method of wireless communication.

FIG. 10 is a flowchart 1000 of a method of wireless communication. The method may be performed by a base station or a component of a base station (e.g., the base station 102, 180, 310, 901; the apparatus 1402; a processing system, which may include the memory 376 and which may be the entire base station or a component of the base station, such as the antenna(s) 320, receiver 318RX, the RX processor 370, the controller/processor 375, and/or the like). The methods described herein may provide a number of benefits, such as improving communication signaling, resource utilization, and/or power savings.

At 1002, the base station may send a request to a second BS to configure a backhaul routing path via the second BS to a third BS that has a signaling connection to the first BS, as described in connection with the examples in FIGS. 4, 5, 6, 7, 8, and 9. For example, base station 901 may send a request to a second BS to configure a backhaul routing path via the second BS to a third BS that has a signaling connection to the first BS, as described in connection with 910 in FIG. 9. Further, 1002 may be performed by determination component 1440.

In some aspects, the backhaul routing path may include a chain of at least one backhaul radio link control (RLC) channel between the second BS and the third BS, as described in connection with the examples in FIGS. 4, 5, 6, 7, 8, and 9. The backhaul routing path may carry at least one F1 control-plane (F1-C) traffic, F1 user-plane (F1-U) traffic, or non-F1 traffic, as described in connection with the examples in FIGS. 4, 5, 6, 7, 8, and 9. The backhaul routing path may also carry traffic for a child user equipment (UE) of the third BS or a child integrated access backhaul (IAB) node mobile termination (MT) of the third BS, as described in connection with the examples in FIGS. 4, 5, 6, 7, 8, and 9. Also, the backhaul routing path may carry traffic for a descendant user equipment (UE) of the third BS or a descendant integrated access backhaul (IAB) node mobile termination (MT) of the third BS, as described in connection with the examples in FIGS. 4, 5, 6, 7, 8, and 9.

Additionally, the signaling connection may include at least one of a radio resource control (RRC) signaling connection, or a F1 control plane (F1-C) signaling connection, as described in connection with the examples in FIGS. 4, 5, 6, 7, 8, and 9. The third BS may have a second signaling connection with the second BS, as described in connection with the examples in FIGS. 4, 5, 6, 7, 8, and 9. The second signaling connection may include at least one of a radio resource control (RRC) signaling connection, or a F1 control plane (F1-C) signaling connection, as described in connection with the examples in FIGS. 4, 5, 6, 7, 8, and 9.

At 1004, the base station may communicate, with the second BS, a first backhaul adaptation protocol (BAP) configuration associated with the backhaul routing path, as described in connection with the examples in FIGS. 4, 5, 6, 7, 8, and 9. For example, base station 901 may communicate, with the second BS, a first backhaul adaptation protocol (BAP) configuration associated with the backhaul routing path, as described in connection with 920 in FIG. 9. Further, 1004 may be performed by determination component 1440. In some aspects, the communicating, with the second BS, the first BAP configuration associated with the backhaul routing path may include at least one of: transmitting at least a first part of the first BAP configuration to the second BS; or receiving at least a second part of the first BAP configuration from the second BS, as described in connection with the examples in FIGS. 4, 5, 6, 7, 8, and 9.

In some aspects, the first BAP configuration may include at least one of a BAP routing identifier (ID) of the backhaul routing path, a BAP path ID of the backhaul routing path, a BAP address of the third BS, a BAP address of a parent node of the third BS on the backhaul routing path, a BAP address of the second BS on the backhaul routing path, a backhaul radio link control (RLC) channel ID of a backhaul RLC channel between the third BS and the parent node of the third BS on the backhaul routing path, or a logical channel ID (LCID) of the backhaul RLC channel between the third BS and the parent node of the third BS on the backhaul routing path, as described in connection with the examples in FIGS. 4, 5, 6, 7, 8, and 9. Moreover, the first BAP configuration may be uplink specific, downlink specific, or bidirectional, as described in connection with the examples in FIGS. 4, 5, 6, 7, 8, and 9.

At 1006, the base station may transmit a second BAP configuration to the third BS in association with the communicated first BAP configuration, as described in connection with the examples in FIGS. 4, 5, 6, 7, 8, and 9. For example, base station 901 may transmit a second BAP configuration to the third BS in association with the communicated first BAP configuration, as described in connection with 940 in FIG. 9. Further, 1006 may be performed by determination component 1440. In some instances, the second BAP configuration may include at least one of: an uplink mapping to a BAP routing identifier (ID) of the first BAP configuration; an uplink mapping to an egress backhaul radio link control (RLC) channel with a backhaul RLC channel ID or logical channel ID (LCD) of the first BAP configuration; a routing configuration of the BAP routing ID of the first BAP configuration to an egress link; a routing configuration to a next-hop BAP address of the first BAP configuration for a parent node of the third BS on the backhaul routing path; a backhaul RLC channel mapping configuration from an ingress backhaul RLC channel with the backhaul RLC channel ID or the LCID of the first BAP configuration to the egress backhaul RLC channel; a backhaul RLC channel mapping configuration from the ingress backhaul RLC channel to the egress backhaul RLC channel with the backhaul RLC channel ID or the LCID of the first BAP configuration; a downlink mapping to the BAP routing ID of the first BAP configuration; a downlink mapping to the egress backhaul RLC channel with the backhaul RLC channel ID or the LCID of the first BAP configuration; or an allocation of Internet protocol (IP) address information to the third BS and a BAP address of the first BAP configuration for the second BS on the backhaul routing path, as described in connection with the examples in FIGS. 4, 5, 6, 7, 8, and 9.

Figure 11:
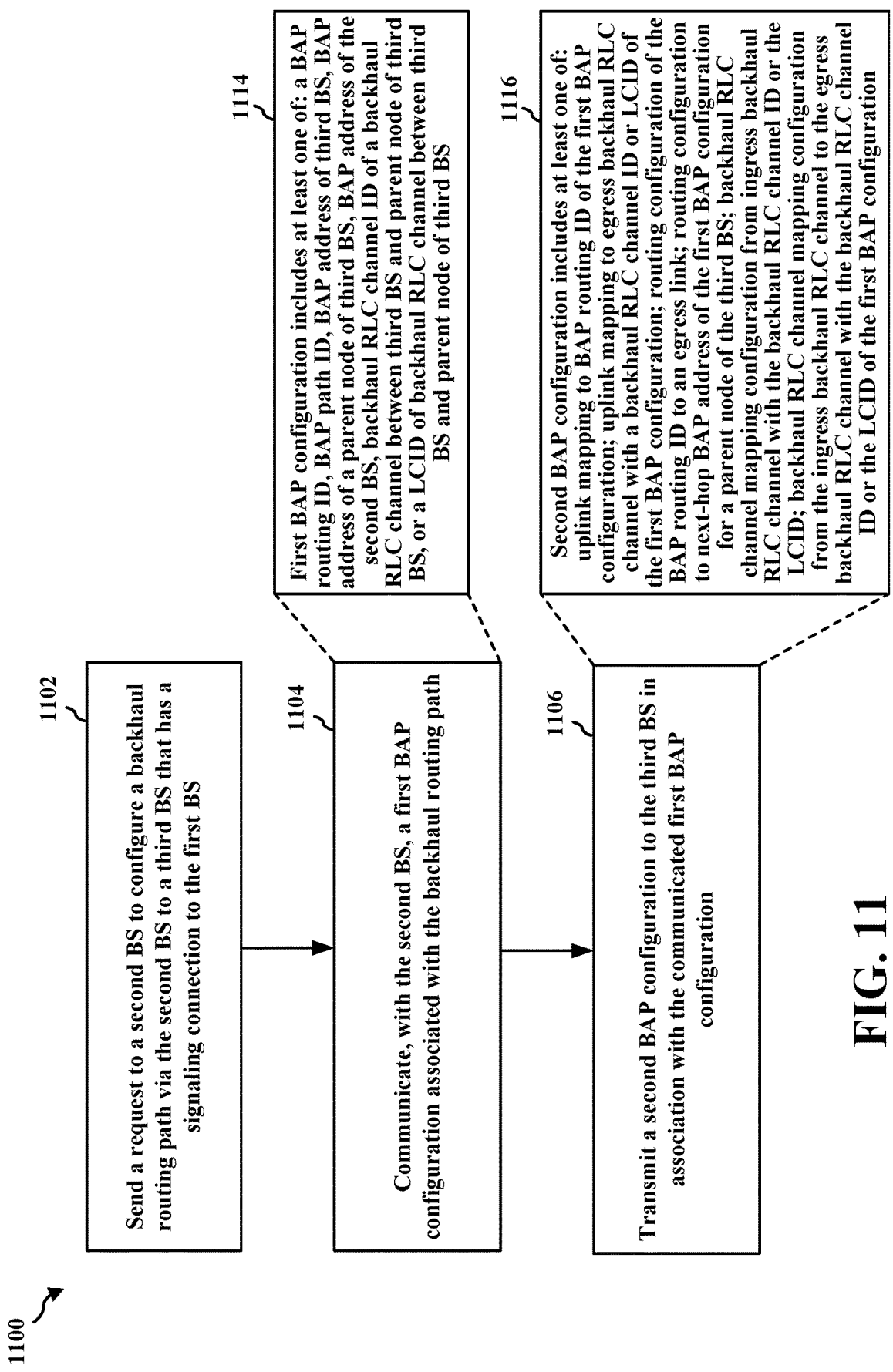
FIG. 11 is a flowchart of a method of wireless communication.

FIG. 11 is a flowchart 1100 of a method of wireless communication. The method may be performed by a base station or a component of a base station (e.g., the base station 102, 180, 310, 901; the apparatus 1402; a processing system, which may include the memory 376 and which may be the entire base station or a component of the base station, such as the antenna(s) 320, receiver 318RX, the RX processor 370, the controller/processor 375, and/or the like). The methods described herein may provide a number of benefits, such as improving communication signaling, resource utilization, and/or power savings.

At 1102, the base station may send a request to a second BS to configure a backhaul routing path via the second BS to a third BS that has a signaling connection to the first BS, as described in connection with the examples in FIGS. 4, 5, 6, 7, 8, and 9. For example, base station 901 may send a request to a second BS to configure a backhaul routing path via the second BS to a third BS that has a signaling connection to the first BS, as described in connection with 910 in FIG. 9. Further, 1102 may be performed by determination component 1440.

In some aspects, the backhaul routing path may include a chain of at least one backhaul radio link control (RLC) channel between the second BS and the third BS, as described in connection with the examples in FIGS. 4, 5, 6, 7, 8, and 9. The backhaul routing path may carry at least one F1 control-plane (F1-C) traffic, F1 user-plane (F1-U) traffic, or non-F1 traffic, as described in connection with the examples in FIGS. 4, 5, 6, 7, 8, and 9. The backhaul routing path may also carry traffic for a child user equipment (UE) of the third BS or a child integrated access backhaul (IAB) node mobile termination (MT) of the third BS, as described in connection with the examples in FIGS. 4, 5, 6, 7, 8, and 9. Also, the backhaul routing path may carry traffic for a descendant user equipment (UE) of the third BS or a descendant integrated access backhaul (IAB) node mobile termination (MT) of the third BS, as described in connection with the examples in FIGS. 4, 5, 6, 7, 8, and 9.

Additionally, the signaling connection may include at least one of a radio resource control (RRC) signaling connection, or a F1 control plane (F1-C) signaling connection, as described in connection with the examples in FIGS. 4, 5, 6, 7, 8, and 9. The third BS may have a second signaling connection with the second BS, as described in connection with the examples in FIGS. 4, 5, 6, 7, 8, and 9. The second signaling connection may include at least one of a radio resource control (RRC) signaling connection, or a F1 control plane (F1-C) signaling connection, as described in connection with the examples in FIGS. 4, 5, 6, 7, 8, and 9.

At 1104, the base station may communicate, with the second BS, a first backhaul adaptation protocol (BAP) configuration associated with the backhaul routing path, as described in connection with the examples in FIGS. 4, 5, 6, 7, 8, and 9. For example, base station 901 may communicate, with the second BS, a first backhaul adaptation protocol (BAP) configuration associated with the backhaul routing path, as described in connection with 920 in FIG. 9. Further, 1104 may be performed by determination component 1440. In some aspects, the communicating, with the second BS, the first BAP configuration associated with the backhaul routing path may include at least one of: transmitting at least a first part of the first BAP configuration to the second BS; or receiving at least a second part of the first BAP configuration from the second BS, as described in connection with the examples in FIGS. 4, 5, 6, 7, 8, and 9.

As shown at 1114, the first BAP configuration may include at least one of a BAP routing identifier (ID) of the backhaul routing path, a BAP path ID of the backhaul routing path, a BAP address of the third BS, a BAP address of a parent node of the third BS on the backhaul routing path, a BAP address of the second BS on the backhaul routing path, a backhaul radio link control (RLC) channel ID of a backhaul RLC channel between the third BS and the parent node of the third BS on the backhaul routing path, or a logical channel ID (LCID) of the backhaul RLC channel between the third BS and the parent node of the third BS on the backhaul routing path, as described in connection with the examples in FIGS. 4, 5, 6, 7, 8, and 9. Moreover, the first BAP configuration may be uplink specific, downlink specific, or bidirectional, as described in connection with the examples in FIGS. 4, 5, 6, 7, 8, and 9.

At 1106, the base station may transmit a second BAP configuration to the third BS in association with the communicated first BAP configuration, as described in connection with the examples in FIGS. 4, 5, 6, 7, 8, and 9. For example, base station 901 may transmit a second BAP configuration to the third BS in association with the communicated first BAP configuration, as described in connection with 940 in FIG. 9. Further, 1106 may be performed by determination component 1440.

As shown at 1116, the second BAP configuration may include at least one of: an uplink mapping to a BAP routing identifier (ID) of the first BAP configuration; an uplink mapping to an egress backhaul radio link control (RLC) channel with a backhaul RLC channel ID or logical channel ID (LCID) of the first BAP configuration; a routing configuration of the BAP routing ID of the first BAP configuration to an egress link; a routing configuration to a next-hop BAP address of the first BAP configuration for a parent node of the third BS on the backhaul routing path; a backhaul RLC channel mapping configuration from an ingress backhaul RLC channel with the backhaul RLC channel ID or the LCID of the first BAP configuration to the egress backhaul RLC channel; a backhaul RLC channel mapping configuration from the ingress backhaul RLC channel to the egress backhaul RLC channel with the backhaul RLC channel ID or the LCID of the first BAP configuration; a downlink mapping to the BAP routing ID of the first BAP configuration; a downlink mapping to the egress backhaul RLC channel with the backhaul RLC channel ID or the LCID of the first BAP configuration; or an allocation of Internet protocol (IP) address information to the third BS and a BAP address of the first BAP configuration for the second BS on the backhaul routing path, as described in connection with the examples in FIGS. 4, 5, 6, 7, 8, and 9.

Figure 12:
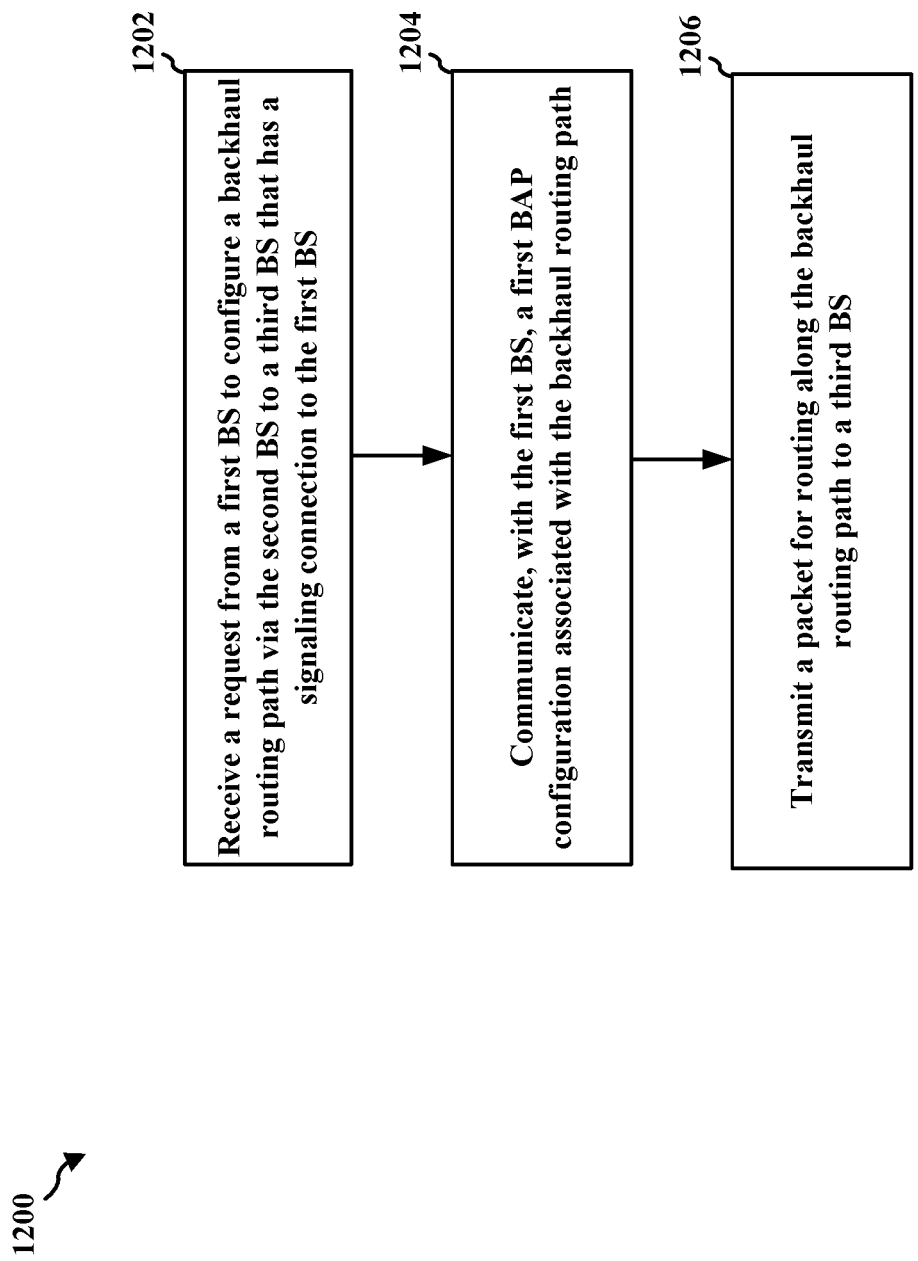
FIG. 12 is a flowchart of a method of wireless communication.

FIG. 12 is a flowchart 1200 of a method of wireless communication. The method may be performed by a base station or a component of a base station (e.g., the base station 102, 180, 310, 902; the apparatus 1502; a processing system, which may include the memory 376 and which may be the entire base station or a component of the base station, such as the antenna(s) 320, receiver 318RX, the RX processor 370, the controller/processor 375, and/or the like). The methods described herein may provide a number of benefits, such as improving communication signaling, resource utilization, and/or power savings.

At 1202, the base station may receive a request from a first BS to configure a backhaul routing path via the second BS to a third BS that has a signaling connection to the first BS, as described in connection with the examples in FIGS. 4, 5, 6, 7, 8, and 9. For example, base station 902 may receive a request from a first BS to configure a backhaul routing path via the second BS to a third BS that has a signaling connection to the first BS, as described in connection with 912 in FIG. 9. Further, 1202 may be performed by determination component 1540.

In some aspects, the backhaul routing path may include a chain of at least one backhaul radio link control (RLC) channel between the second BS and the third BS, as described in connection with the examples in FIGS. 4, 5, 6, 7, 8, and 9. The backhaul routing path may carry at least one F1 control-plane (F1-C) traffic, F1 user-plane (F1-U) traffic, or non-F1 traffic, as described in connection with the examples in FIGS. 4, 5, 6, 7, 8, and 9. The backhaul routing path may also carry traffic for a child user equipment (UE) of the third BS or a child integrated access backhaul (IAB) node mobile termination (MT) of the third BS, as described in connection with the examples in FIGS. 4, 5, 6, 7, 8, and 9. Further, the backhaul routing path may carry traffic for a descendant user equipment (UE) of the third BS or a descendant integrated access backhaul (IAB) node mobile termination (MT) of the third BS, as described in connection with the examples in FIGS. 4, 5, 6, 7, 8, and 9.

In some instances, the signaling connection may include at least one of a radio resource control (RRC) signaling connection, or a F1 control plane (F1-C) signaling connection, as described in connection with the examples in FIGS. 4, 5, 6, 7, 8, and 9. The third BS may also have a second signaling connection with the second BS, as described in connection with the examples in FIGS. 4, 5, 6, 7, 8, and 9. The second signaling connection may include at least one of a radio resource control (RRC) signaling connection, or a F1 control plane (F1-C) signaling connection, as described in connection with the examples in FIGS. 4, 5, 6, 7, 8, and 9.

At 1204, the base station may communicate, with the first BS, a first backhaul adaptation protocol (BAP) configuration associated with the backhaul routing path, as described in connection with the examples in FIGS. 4, 5, 6, 7, 8, and 9. For example, base station 902 may communicate, with the first BS, a first backhaul adaptation protocol (BAP) configuration associated with the backhaul routing path, as described in connection with 922 in FIG. 9. Further, 1204 may be performed by determination component 1540. In some instances, the communicating, with the first BS, the first BAP configuration associated with the backhaul routing path may include at least one of: receiving at least a first part of the first BAP configuration from the first BS; or transmitting at least a second part of the first BAP configuration to the first BS, as described in connection with the examples in FIGS. 4, 5, 6, 7, 8, and 9.

In some instances, the first BAP configuration may include at least one of a BAP routing identifier (ID) of the backhaul routing path, a BAP path ID of the backhaul routing path, a BAP address of the third BS, a BAP address of a parent node of the third BS on the backhaul routing path, a BAP address of the second BS on the backhaul routing path, a backhaul radio link control (RLC) channel ID of a backhaul RLC channel between the third BS and the parent node of the third BS on the backhaul routing path, or a logical channel ID (LCID) of the backhaul RLC channel between the third BS and the parent node of the third BS on the backhaul routing path, as described in connection with the examples in FIGS. 4, 5, 6, 7, 8, and 9. The first BAP configuration may also be uplink specific, downlink specific, or bidirectional, as described in connection with the examples in FIGS. 4, 5, 6, 7, 8, and 9.

At 1206, the base station may transmit a packet for routing along the backhaul routing path to a third BS, as described in connection with the examples in FIGS. 4, 5, 6, 7, 8, and 9. For example, base station 902 may transmit a packet for routing along the backhaul routing path to a third BS, as described in connection with 930 in FIG. 9. Further, 1206 may be performed by determination component 1540.

In some aspects, the base station may transmit, to the third BS or at least one other BS on the backhaul routing path, a second BAP configuration in association with the communicated first BAP configuration, as described in connection with the examples in FIGS. 4, 5, 6, 7, 8, and 9. For example, base station 902 may transmit, to the third BS or at least one other BS on the backhaul routing path, a second BAP configuration in association with the communicated first BAP configuration, as described in connection with 950 in FIG. 9.

In some instances, the second BAP configuration includes at least one of: an uplink mapping to a BAP routing identifier (ID) of the first BAP configuration; an uplink mapping to an egress backhaul radio link control (RLC) channel with a backhaul RLC channel ID or logical channel ID (LCD) of the first BAP configuration; a routing configuration of the BAP routing ID of the first BAP configuration to an egress link; a routing configuration to a next-hop BAP address of the first BAP configuration for a parent node of the third BS on the backhaul routing path; a backhaul RLC channel mapping configuration from an ingress backhaul RLC channel with the backhaul RLC channel ID or the LCID of the first BAP configuration to the egress backhaul RLC channel; a backhaul RLC channel mapping configuration from the ingress backhaul RLC channel to the egress backhaul RLC channel with the backhaul RLC channel ID or the LCID of the first BAP configuration; a downlink mapping to the BAP routing ID of the first BAP configuration; a downlink mapping to the egress backhaul RLC channel with the backhaul RLC channel ID or the LCID of the first BAP configuration; or an allocation of Internet protocol (IP) address information to the third BS and a BAP address of the first BAP configuration for the second BS on the backhaul routing path, as described in connection with the examples in FIGS. 4, 5, 6, 7, 8, and 9.

Figure 13:
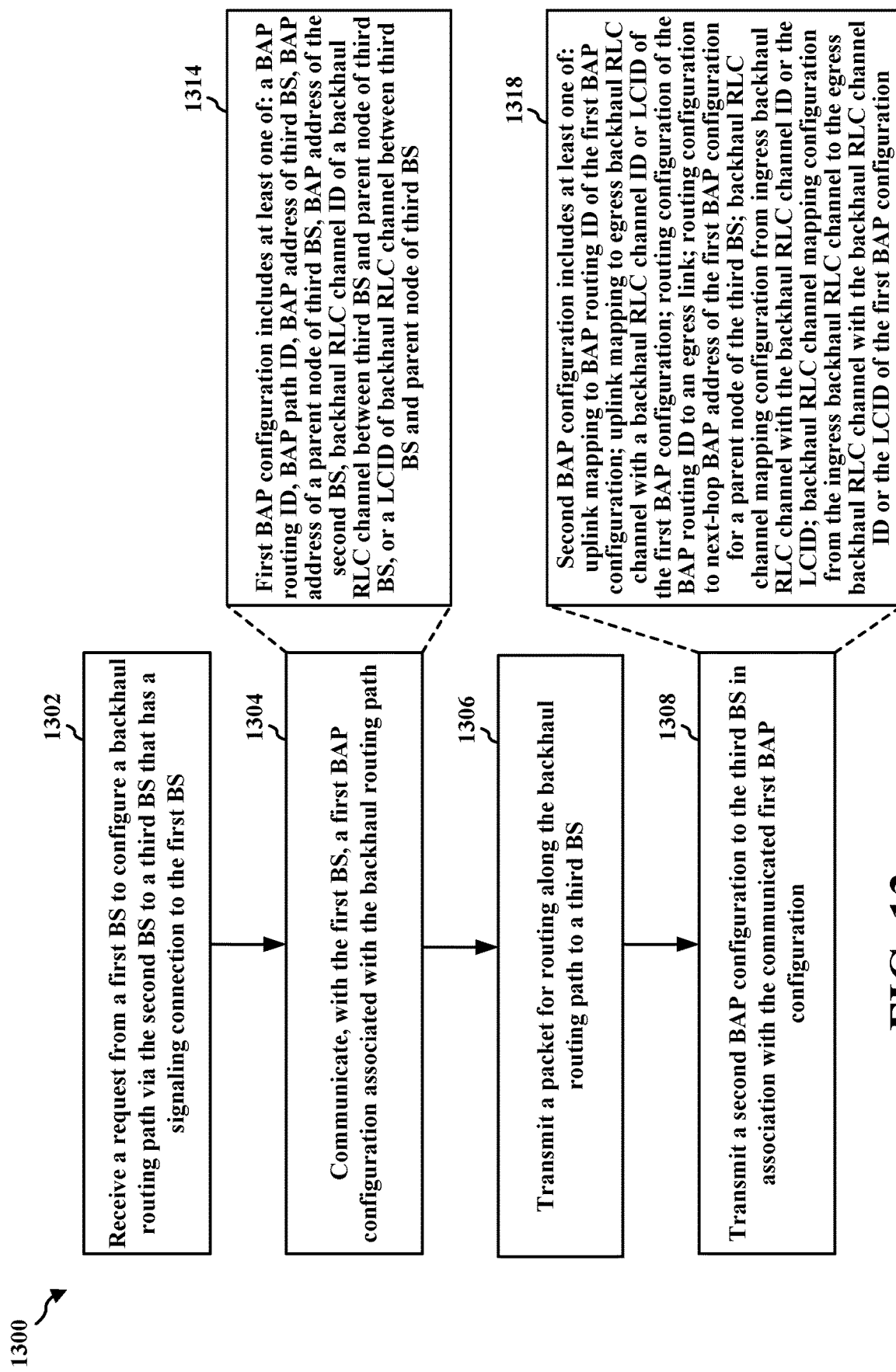
FIG. 13 is a flowchart of a method of wireless communication.

FIG. 13 is a flowchart 1300 of a method of wireless communication. The method may be performed by a base station or a component of a base station (e.g., the base station 102, 180, 310, 902; the apparatus 1502; a processing system, which may include the memory 376 and which may be the entire base station or a component of the base station, such as the antenna(s) 320, receiver 318RX, the RX processor 370, the controller/processor 375, and/or the like). The methods described herein may provide a number of benefits, such as improving communication signaling, resource utilization, and/or power savings.

At 1302, the base station may receive a request from a first BS to configure a backhaul routing path via the second BS to a third BS that has a signaling connection to the first BS, as described in connection with the examples in FIGS. 4, 5, 6, 7, 8, and 9. For example, base station 902 may receive a request from a first BS to configure a backhaul routing path via the second BS to a third BS that has a signaling connection to the first BS, as described in connection with 912 in FIG. 9. Further, 1302 may be performed by determination component 1540.

In some aspects, the backhaul routing path may include a chain of at least one backhaul radio link control (RLC) channel between the second BS and the third BS, as described in connection with the examples in FIGS. 4, 5, 6, 7, 8, and 9. The backhaul routing path may carry at least one F1 control-plane (F1-C) traffic, F1 user-plane (F1-U) traffic, or non-F1 traffic, as described in connection with the examples in FIGS. 4, 5, 6, 7, 8, and 9. The backhaul routing path may also carry traffic for a child user equipment (UE) of the third BS or a child integrated access backhaul (IAB) node mobile termination (MT) of the third BS, as described in connection with the examples in FIGS. 4, 5, 6, 7, 8, and 9. Further, the backhaul routing path may carry traffic for a descendant user equipment (UE) of the third BS or a descendant integrated access backhaul (IAB) node mobile termination (MT) of the third BS, as described in connection with the examples in FIGS. 4, 5, 6, 7, 8, and 9.

In some instances, the signaling connection may include at least one of a radio resource control (RRC) signaling connection, or a F1 control plane (F1-C) signaling connection, as described in connection with the examples in FIGS. 4, 5, 6, 7, 8, and 9. The third BS may also have a second signaling connection with the second BS, as described in connection with the examples in FIGS. 4, 5, 6, 7, 8, and 9. The second signaling connection may include at least one of a radio resource control (RRC) signaling connection, or a F1 control plane (F1-C) signaling connection, as described in connection with the examples in FIGS. 4, 5, 6, 7, 8, and 9.

At 1304, the base station may communicate, with the first BS, a first backhaul adaptation protocol (BAP) configuration associated with the backhaul routing path, as described in connection with the examples in FIGS. 4, 5, 6, 7, 8, and 9. For example, base station 902 may communicate, with the first BS, a first backhaul adaptation protocol (BAP) configuration associated with the backhaul routing path, as described in connection with 922 in FIG. 9. Further, 1304 may be performed by determination component 1540. In some instances, the communicating, with the first BS, the first BAP configuration associated with the backhaul routing path may include at least one of: receiving at least a first part of the first BAP configuration from the first BS; or transmitting at least a second part of the first BAP configuration to the first BS, as described in connection with the examples in FIGS. 4, 5, 6, 7, 8, and 9.

As shown at 1314, the first BAP configuration may include at least one of a BAP routing identifier (ID) of the backhaul routing path, a BAP path ID of the backhaul routing path, a BAP address of the third BS, a BAP address of a parent node of the third BS on the backhaul routing path, a BAP address of the second BS on the backhaul routing path, a backhaul radio link control (RLC) channel ID of a backhaul RLC channel between the third BS and the parent node of the third BS on the backhaul routing path, or a logical channel ID (LCID) of the backhaul RLC channel between the third BS and the parent node of the third BS on the backhaul routing path, as described in connection with the examples in FIGS. 4, 5, 6, 7, 8, and 9. The first BAP configuration may also be uplink specific, downlink specific, or bidirectional, as described in connection with the examples in FIGS. 4, 5, 6, 7, 8, and 9.

At 1306, the base station may transmit a packet for routing along the backhaul routing path to a third BS, as described in connection with the examples in FIGS. 4, 5, 6, 7, 8, and 9. For example, base station 902 may transmit a packet for routing along the backhaul routing path to a third BS, as described in connection with 930 in FIG. 9. Further, 1306 may be performed by determination component 1540.

At 1308, the base station may transmit, to the third BS or at least one other BS on the backhaul routing path, a second BAP configuration in association with the communicated first BAP configuration, as described in connection with the examples in FIGS. 4, 5, 6, 7, 8, and 9. For example, base station 902 may transmit, to the third BS or at least one other BS on the backhaul routing path, a second BAP configuration in association with the communicated first BAP configuration, as described in connection with 950 in FIG. 9. Further, 1308 may be performed by determination component 1540.

As shown at 1318, the second BAP configuration may include at least one of: an uplink mapping to a BAP routing identifier (ID) of the first BAP configuration; an uplink mapping to an egress backhaul radio link control (RLC) channel with a backhaul RLC channel ID or logical channel ID (LCID) of the first BAP configuration; a routing configuration of the BAP routing ID of the first BAP configuration to an egress link; a routing configuration to a next-hop BAP address of the first BAP configuration for a parent node of the third BS on the backhaul routing path; a backhaul RLC channel mapping configuration from an ingress backhaul RLC channel with the backhaul RLC channel ID or the LCID of the first BAP configuration to the egress backhaul RLC channel; a backhaul RLC channel mapping configuration from the ingress backhaul RLC channel to the egress backhaul RLC channel with the backhaul RLC channel ID or the LCID of the first BAP configuration; a downlink mapping to the BAP routing ID of the first BAP configuration; a downlink mapping to the egress backhaul RLC channel with the backhaul RLC channel ID or the LCID of the first BAP configuration; or an allocation of Internet protocol (IP) address information to the third BS and a BAP address of the first BAP configuration for the second BS on the backhaul routing path, as described in connection with the examples in FIGS. 4, 5, 6, 7, 8, and 9.

Figure 14:
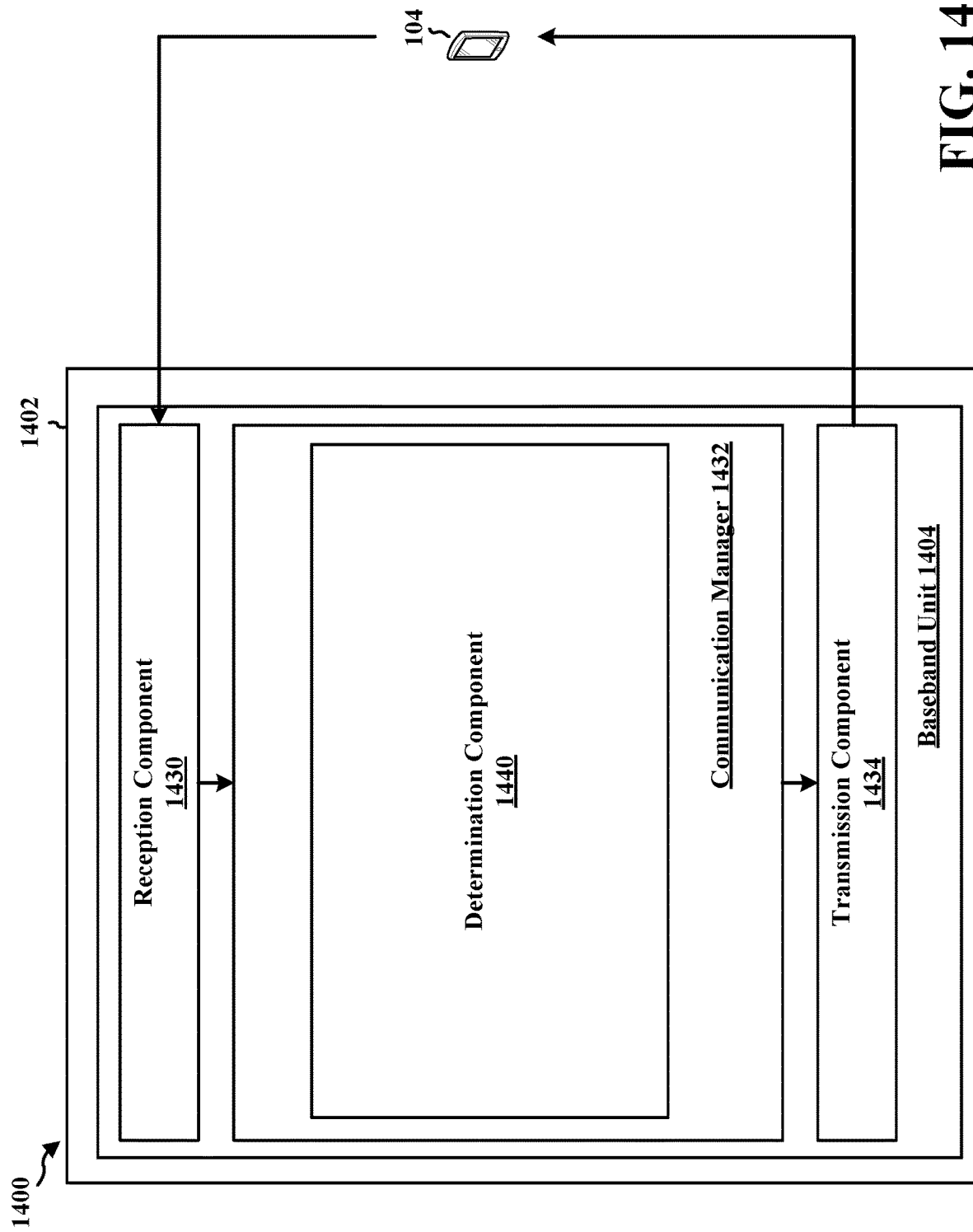
FIG. 14 is a diagram illustrating an example of a hardware implementation for an example apparatus.

FIG. 14 is a diagram 1400 illustrating an example of a hardware implementation for an apparatus 1402. The apparatus 1402 is a base station and includes a baseband unit 1404. The baseband unit 1404 may communicate through a cellular RF transceiver with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the BS 310 and may include the memory 376 and/or at least one of the TX processor 316, the RX processor 370, and the controller/processor 375.

The communication manager 1432 includes a determination component 1440 that is configured to send a request to a second BS to configure a backhaul routing path via the second BS to a third BS that has a signaling connection to the first BS, e.g., as described in connection with step 1102 above. Determination component 1440 may also be configured to communicate, with the second BS, a first backhaul adaptation protocol (BAP) configuration associated with the backhaul routing path, e.g., as described in connection with step 1104 above. Determination component 1440 may also be configured to transmit a second BAP configuration to the third BS in association with the communicated first BAP configuration, e.g., as described in connection with step 1106 above.

The apparatus may include additional components that perform each of the blocks of the algorithm in the aforementioned flowcharts of FIGS. 9, 10, and 11. As such, each block in the aforementioned flowcharts of FIGS. 9, 10, and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for sending a request to a second BS to configure a backhaul routing path via the second BS to a third BS that has a signaling connection to the first BS. The apparatus 1402 may also include means for communicating, with the second BS, a first backhaul adaptation protocol (BAP) configuration associated with the backhaul routing path. The apparatus 1402 may also include means for transmitting a second BAP configuration to the third BS in association with the communicated first BAP configuration. The aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 15:
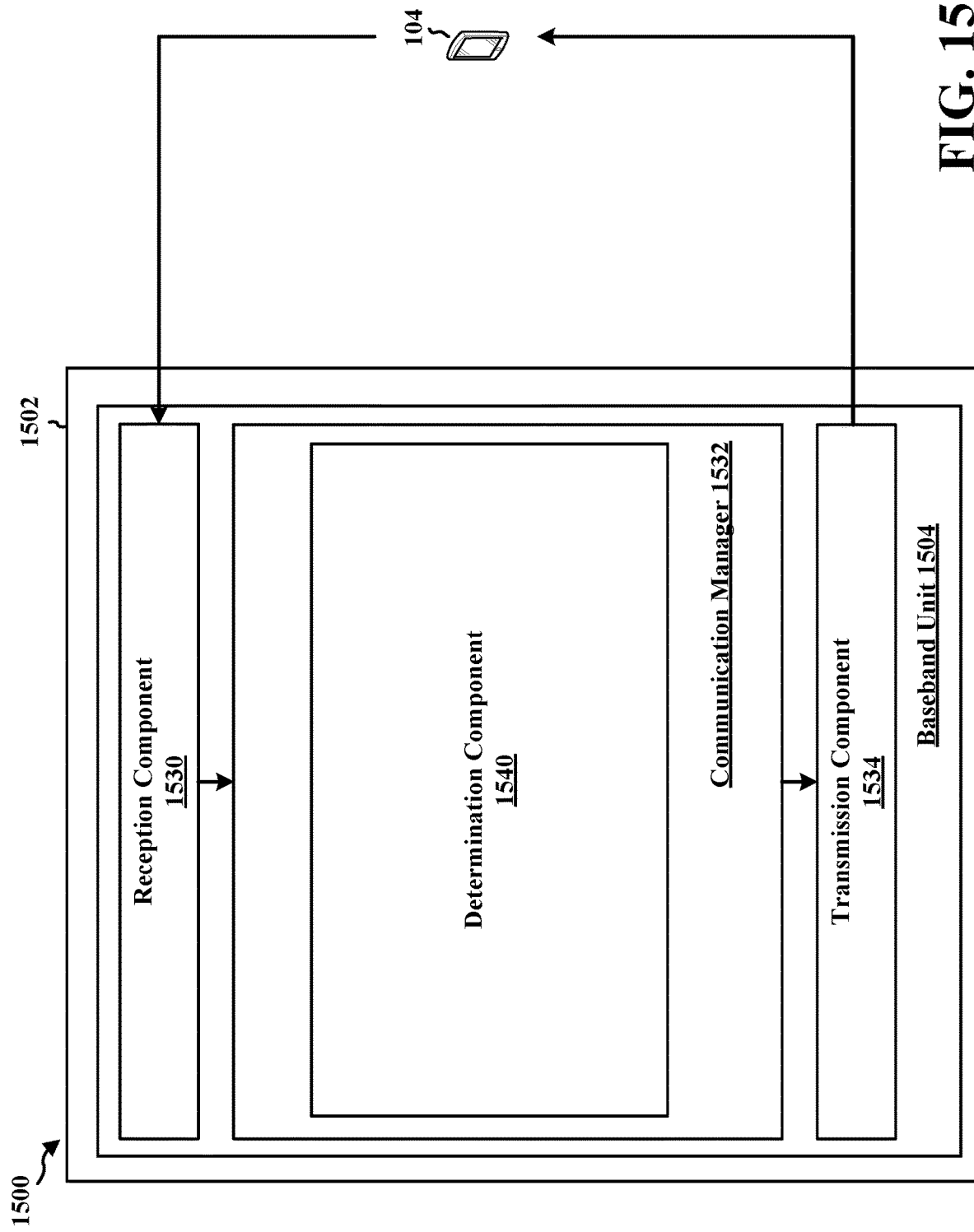
FIG. 15 is a diagram illustrating an example of a hardware implementation for an example apparatus.

FIG. 15 is a diagram 1500 illustrating an example of a hardware implementation for an apparatus 1502. The apparatus 1502 is a base station and includes a baseband unit 1504. The baseband unit 1504 may communicate through a cellular RF transceiver with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the BS 310 and may include the memory 376 and/or at least one of the TX processor 316, the RX processor 370, and the controller/processor 375.

The communication manager 1532 includes a determination component 1540 that is configured to receive a request from a first BS to configure a backhaul routing path via the second BS to a third BS that has a signaling connection to the first BS, e.g., as described in connection with step 1302 above. Determination component 1540 may also be configured to communicate, with the first BS, a first backhaul adaptation protocol (BAP) configuration associated with the backhaul routing path, e.g., as described in connection with step 1304 above. Determination component 1540 may also be configured to transmit a packet for routing along the backhaul routing path to a third BS, e.g., as described in connection with step 1306 above. Determination component 1540 may also be configured to transmit a second BAP configuration to the third BS in association with the communicated first BAP configuration, e.g., as described in connection with step 1308 above.

The apparatus may include additional components that perform each of the blocks of the algorithm in the aforementioned flowcharts of FIGS. 9, 12, and 13. As such, each block in the aforementioned flowcharts of FIGS. 9, 12, and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband unit 1504, includes means for receiving a request from a first BS to configure a backhaul routing path via the second BS to a third BS that has a signaling connection to the first BS. The apparatus 1502 may also include means for communicating, with the first BS, a first backhaul adaptation protocol (BAP) configuration associated with the backhaul routing path. The apparatus 1502 may also include means for transmitting a packet for routing along the backhaul routing path to a third BS. The apparatus 1502 may also include means for transmitting a second BAP configuration to the third BS in association with the communicated first BAP configuration. The aforementioned means may be one or more of the aforementioned components of the apparatus 1502 configured to perform the functions recited by the aforementioned means. As described supra, the apparatus 1502 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first base station (BS) including at least one processor coupled to a memory and configured to: send a request to a second BS to configure a backhaul routing path via the second BS to a third BS that has a signaling connection to the first BS; communicate, with the second BS, a first backhaul adaptation protocol (BAP) configuration associated with the backhaul routing path; and transmit a second BAP configuration to the third BS in association with the communicated first BAP configuration.

Aspect 2 is the apparatus of aspect 1, where the backhaul routing path includes a chain of at least one backhaul radio link control (RLC) channel between the second BS and the third BS.

Aspect 3 is the apparatus of any of aspects 1 and 2, where the signaling connection includes at least one of a radio resource control (RRC) signaling connection, or a F1 control plane (F1-C) signaling connection.

Aspect 4 is the apparatus of any of aspects 1 to 3, where the third BS has a second signaling connection with the second BS.

Aspect 5 is the apparatus of any of aspects 1 to 4, where the second signaling connection includes at least one of a radio resource control (RRC) signaling connection, or a F1 control plane (F1-C) signaling connection.

Aspect 6 is the apparatus of any of aspects 1 to 5, where the backhaul routing path carries at least one F1 control-plane (F1-C) traffic, F1 user-plane (F1-U) traffic, or non-F1 traffic.

Aspect 7 is the apparatus of any of aspects 1 to 6, where the backhaul routing path carries traffic for a child user equipment (UE) of the third BS or a child integrated access backhaul (IAB) node mobile termination (MT) of the third BS.

Aspect 8 is the apparatus of any of aspects 1 to 7, where the backhaul routing path carries traffic for a descendant user equipment (UE) of the third BS or a descendant integrated access backhaul (IAB) node mobile termination (MT) of the third BS.

Aspect 9 is the apparatus of any of aspects 1 to 8, where to communicate, with the second BS, the first BAP configuration associated with the backhaul routing path, the at least one processor is further configured to at least one of: transmit at least a first part of the first BAP configuration to the second B S; or receive at least a second part of the first BAP configuration from the second BS.

Aspect 10 is the apparatus of any of aspects 1 to 9, where the first BAP configuration includes at least one of a BAP routing identifier (ID) of the backhaul routing path, a BAP path ID of the backhaul routing path, a BAP address of the third BS, a BAP address of a parent node of the third BS on the backhaul routing path, a BAP address of the second BS on the backhaul routing path, a backhaul radio link control (RLC) channel ID of a backhaul RLC channel between the third BS and the parent node of the third BS on the backhaul routing path, or a logical channel ID (LCD) of the backhaul RLC channel between the third BS and the parent node of the third BS on the backhaul routing path.

Aspect 11 is the apparatus of any of aspects 1 to 10, further including a transceiver or an antenna coupled to the at least one processor, where the first BAP configuration is uplink specific, downlink specific, or bidirectional.

Aspect 12 is the apparatus of any of aspects 1 to 11, where the second BAP configuration includes at least one of: an uplink mapping to a BAP routing identifier (ID) of the first BAP configuration; an uplink mapping to an egress backhaul radio link control (RLC) channel with a backhaul RLC channel ID or logical channel ID (LCD) of the first BAP configuration; a routing configuration of the BAP routing ID of the first BAP configuration to an egress link; a routing configuration to a next-hop BAP address of the first BAP configuration for a parent node of the third BS on the backhaul routing path; a backhaul RLC channel mapping configuration from an ingress backhaul RLC channel with the backhaul RLC channel ID or the LCID of the first BAP configuration to the egress backhaul RLC channel; a backhaul RLC channel mapping configuration from the ingress backhaul RLC channel to the egress backhaul RLC channel with the backhaul RLC channel ID or the LCID of the first BAP configuration; a downlink mapping to the BAP routing ID of the first BAP configuration; a downlink mapping to the egress backhaul RLC channel with the backhaul RLC channel ID or the LCID of the first BAP configuration; or an allocation of Internet protocol (IP) address information to the third BS and a BAP address of the first BAP configuration for the second BS on the backhaul routing path.

Aspect 13 is an apparatus for wireless communication including means for implementing any of aspects 1 to 12.

Aspect 14 is a method of wireless communication for implementing any of aspects 1 to 12.

Aspect 15 is a computer-readable medium storing computer executable code, where the code when executed by a processor causes the processor to implement any of aspects 1 to 12.

Aspect 16 is an apparatus for wireless communication at a second base station (BS) including at least one processor coupled to a memory and configured to: receive a request from a first BS to configure a backhaul routing path via the second BS to a third BS that has a signaling connection to the first BS; communicate, with the first BS, a first backhaul adaptation protocol (BAP) configuration associated with the backhaul routing path; and transmit a packet for routing along the backhaul routing path to a third BS.

Aspect 17 is the apparatus of aspect 16, where the backhaul routing path includes a chain of at least one backhaul radio link control (RLC) channel between the second BS and the third BS.

Aspect 18 is the apparatus of any of aspects 16 and 17, where the signaling connection includes at least one of a radio resource control (RRC) signaling connection, or a F1 control plane (F1-C) signaling connection.

Aspect 19 is the apparatus of any of aspects 16 to 18, where the third BS has a second signaling connection with the second BS.

Aspect 20 is the apparatus of any of aspects 16 to 19, where the second signaling connection includes at least one of a radio resource control (RRC) signaling connection, or a F1 control plane (F1-C) signaling connection.

Aspect 21 is the apparatus of any of aspects 16 to 20, where the backhaul routing path carries at least one F1 control-plane (F1-C) traffic, F1 user-plane (F1-U) traffic, or non-F1 traffic.

Aspect 22 is the apparatus of any of aspects 16 to 21, where the backhaul routing path carries traffic for a child user equipment (UE) of the third BS or a child integrated access backhaul (IAB) node mobile termination (MT) of the third BS.

Aspect 23 is the apparatus of any of aspects 16 to 22, where the backhaul routing path carries traffic for a descendant user equipment (UE) of the third BS or a descendant integrated access backhaul (IAB) node mobile termination (MT) of the third BS.

Aspect 24 is the apparatus of any of aspects 16 to 23, where to communicate, with the first BS, the first BAP configuration associated with the backhaul routing path, the at least one processor is further configured to at least one of: receive at least a first part of the first BAP configuration from the first BS; or transmit at least a second part of the first BAP configuration to the first BS.

Aspect 25 is the apparatus of any of aspects 16 to 24, where the first BAP configuration includes at least one of a BAP routing identifier (ID) of the backhaul routing path, a BAP path ID of the backhaul routing path, a BAP address of the third BS, a BAP address of a parent node of the third BS on the backhaul routing path, a BAP address of the second BS on the backhaul routing path, a backhaul radio link control (RLC) channel ID of a backhaul RLC channel between the third BS and the parent node of the third BS on the backhaul routing path, or a logical channel ID (LCD) of the backhaul RLC channel between the third BS and the parent node of the third BS on the backhaul routing path.

Aspect 26 is the apparatus of any of aspects 16 to 25, further including a transceiver or an antenna coupled to the at least one processor, where the first BAP configuration is uplink specific, downlink specific, or bidirectional.

Aspect 27 is the apparatus of any of aspects 16 to 26, where the at least one processor is further configured to: transmit, to the third BS or at least one other BS on the backhaul routing path, a second BAP configuration in association with the communicated first BAP configuration.

Aspect 28 is the apparatus of any of aspects 16 to 27, where the second BAP configuration includes at least one of: an uplink mapping to a BAP routing identifier (ID) of the first BAP configuration; an uplink mapping to an egress backhaul radio link control (RLC) channel with a backhaul RLC channel ID or logical channel ID (LCD) of the first BAP configuration; a routing configuration of the BAP routing ID of the first BAP configuration to an egress link; a routing configuration to a next-hop BAP address of the first BAP configuration for a parent node of the third BS on the backhaul routing path; a backhaul RLC channel mapping configuration from an ingress backhaul RLC channel with the backhaul RLC channel ID or the LCID of the first BAP configuration to the egress backhaul RLC channel; a backhaul RLC channel mapping configuration from the ingress backhaul RLC channel to the egress backhaul RLC channel with the backhaul RLC channel ID or the LCID of the first BAP configuration; a downlink mapping to the BAP routing ID of the first BAP configuration; a downlink mapping to the egress backhaul RLC channel with the backhaul RLC channel ID or the LCID of the first BAP configuration; or an allocation of Internet protocol (IP) address information to the third BS and a BAP address of the first BAP configuration for the second BS on the backhaul routing path.

Aspect 29 is an apparatus for wireless communication including means for implementing any of aspects 16 to 28.

Aspect 30 is a method of wireless communication for implementing any of aspects 16 to 28.

Aspect 31 is a computer-readable medium storing computer executable code, where the code when executed by a processor causes the processor to implement any of aspects 16 to 28.

What is claimed is:

1. An apparatus for wireless communication at a first base station (BS), comprising:
   memory; and
   at least one processor coupled to the memory and configured to:
   send a request to a second BS to configure a backhaul routing path via the second BS to a third BS that has a signaling connection to the first BS;
   communicate, with the second BS, a first backhaul adaptation protocol (BAP) configuration associated with the backhaul routing path by being configured to:
   transmit at least a first part of the first BAP configuration to the second BS, or
   receive at least a second part of the first BAP configuration from the second BS; and
   transmit a second BAP configuration to the third BS in association with the communicated first BAP configuration.

2. The apparatus of claim 1, wherein the first BAP configuration comprises at least one of a BAP routing identifier (ID) of the backhaul routing path, a BAP path ID of the backhaul routing path, a BAP address of the third BS, a BAP address of a parent node of the third BS on the backhaul routing path, a BAP address of the second BS on the backhaul routing path, a backhaul radio link control (RLC) channel ID of a backhaul RLC channel between the third BS and the parent node of the third BS on the backhaul routing path, or a logical channel ID (LCID) of the backhaul RLC channel between the third BS and the parent node of the third BS on the backhaul routing path.

3. The apparatus of claim 1, wherein the second BAP configuration comprises at least one of:
   an uplink mapping to a BAP routing identifier (ID) of the first BAP configuration;
   an uplink mapping to an egress backhaul radio link control (RLC) channel with a backhaul RLC channel ID or logical channel ID (LCID) of the first BAP configuration;
   a routing configuration of the BAP routing ID of the first BAP configuration to an egress link;
   a routing configuration to a next-hop BAP address of the first BAP configuration for a parent node of the third BS on the backhaul routing path;
   a backhaul RLC channel mapping configuration from an ingress backhaul RLC channel with the backhaul RLC channel ID or the LCID of the first BAP configuration to the egress backhaul RLC channel;
   a backhaul RLC channel mapping configuration from the ingress backhaul RLC channel to the egress backhaul RLC channel with the backhaul RLC channel ID or the LCID of the first BAP configuration; or
   an allocation of Internet protocol (IP) address information to the third BS and a BAP address of the first BAP configuration for the second BS on the backhaul routing path.

4. The apparatus of claim 1, wherein the backhaul routing path comprises a chain of at least one backhaul radio link control (RLC) channel between the second BS and the third BS.

5. The apparatus of claim 1, wherein the signaling connection comprises at least one of a radio resource control (RRC) signaling connection, or a F1 control plane (F1-C) signaling connection.

6. The apparatus of claim 1, wherein the third BS has a second signaling connection with the second BS.

7. The apparatus of claim 6, wherein the second signaling connection comprises at least one of a radio resource control (RRC) signaling connection, or a F1 control plane (F1-C) signaling connection.

8. The apparatus of claim 1, wherein the backhaul routing path carries at least one F1 control-plane (F1-C) traffic, F1 user-plane (F1-U) traffic, or non-F1 traffic.

9. The apparatus of claim 1, wherein the backhaul routing path carries traffic for a child user equipment (UE) of the third BS or a child integrated access backhaul (IAB) node mobile termination (MT) of the third BS.

10. The apparatus of claim 1, wherein the backhaul routing path carries traffic for a descendant user equipment (UE) of the third BS or a descendant integrated access backhaul (IAB) node mobile termination (MT) of the third BS.

11. The apparatus of claim 1, further comprising a transceiver or an antenna coupled to the at least one processor, wherein the first BAP configuration is uplink specific, downlink specific, or bidirectional.

12. A method of wireless communication at a first base station (BS), comprising:
   sending a request to a second BS to configure a backhaul routing path via the second BS to a third BS that has a signaling connection to the first BS;
   communicating, with the second BS, a first backhaul adaptation protocol (BAP) configuration associated with the backhaul routing path by:
   transmitting at least a first part of the first BAP configuration to the second BS, or receiving at least a second part of the first BAP configuration from the second BS; and transmitting a second BAP configuration to the third BS in association with the communicated first BAP configuration.

13. The method of claim 12, wherein the first BAP configuration comprises at least one of a BAP routing identifier (ID) of the backhaul routing path, a BAP path ID of the backhaul routing path, a BAP address of the third BS, a BAP address of a parent node of the third BS on the backhaul routing path, a BAP address of the second BS on the backhaul routing path, a backhaul radio link control (RLC) channel ID of a backhaul RLC channel between the third BS and the parent node of the third BS on the backhaul routing path, or a logical channel ID (LCID) of the backhaul RLC channel between the third BS and the parent node of the third BS on the backhaul routing path.

14. The method of claim 12, wherein the second BAP configuration comprises at least one of:

an uplink mapping to a BAP routing identifier (ID) of the first BAP configuration;

an uplink mapping to an egress backhaul radio link control (RLC) channel with a backhaul RLC channel ID or logical channel ID (LCID) of the first BAP configuration;

a routing configuration of the BAP routing ID of the first BAP configuration to an egress link;

a routing configuration to a next-hop BAP address of the first BAP configuration for a parent node of the third BS on the backhaul routing path;

a backhaul RLC channel mapping configuration from an ingress backhaul RLC channel with the backhaul RLC channel ID or the LCID of the first BAP configuration to the egress backhaul RLC channel;

a backhaul RLC channel mapping configuration from the ingress backhaul RLC channel to the egress backhaul RLC channel with the backhaul RLC channel ID or the LCID of the first BAP configuration; or an allocation of Internet protocol (IP) address information to the third BS and a BAP address of the first BAP configuration for the second BS on the backhaul routing path.

15. An apparatus for wireless communication at a second base station (BS), comprising:

memory; and at least one processor coupled to the memory and configured to:

receive a request from a first BS to configure a backhaul routing path via the second BS to a third BS that has a signaling connection to the first BS;

communicate, with the first BS, a first backhaul adaptation protocol (BAP) configuration associated with the backhaul routing path by being configured to:

receive at least a first part of the first BAP configuration from the first BS; or transmit at least a second part of the first BAP configuration to the first BS; and transmit, for the third B S, a packet for routing along the backhaul routing path based on the request.

16. The apparatus of claim 15, wherein the first BAP configuration comprises at least one of a BAP routing identifier (ID) of the backhaul routing path, a BAP path ID of the backhaul routing path, a BAP address of the third BS, a BAP address of a parent node of the third BS on the backhaul routing path, a BAP address of the second BS on the backhaul routing path, a backhaul radio link control (RLC) channel ID of a backhaul RLC channel between the third BS and the parent node of the third BS on the backhaul routing path, or a logical channel ID (LCID) of the backhaul RLC channel between the third BS and the parent node of the third BS on the backhaul routing path.

17. The apparatus of claim 15, wherein the second BAP configuration comprises at least one of:

an uplink mapping to a BAP routing identifier (ID) of the first BAP configuration;

an uplink mapping to an egress backhaul radio link control (RLC) channel with a backhaul RLC channel ID or logical channel ID (LCID) of the first BAP configuration;

a routing configuration of the BAP routing ID of the first BAP configuration to an egress link;

a routing configuration to a next-hop BAP address of the first BAP configuration for a parent node of the third BS on the backhaul routing path;

a backhaul RLC channel mapping configuration from an ingress backhaul RLC channel with the backhaul RLC channel ID or the LCID of the first BAP configuration to the egress backhaul RLC channel;

a backhaul RLC channel mapping configuration from the ingress backhaul RLC channel to the egress backhaul RLC channel with the backhaul RLC channel ID or the LCID of the first BAP configuration; or an allocation of Internet protocol (IP) address information to the third BS and a BAP address of the first BAP configuration for the second BS on the backhaul routing path.

18. The apparatus of claim 15, wherein the backhaul routing path comprises a chain of at least one backhaul radio link control (RLC) channel between the second BS and the third BS.

19. The apparatus of claim 15, wherein the signaling connection comprises at least one of a radio resource control (RRC) signaling connection, or a F1 control plane (F1-C) signaling connection.

20. The apparatus of claim 15, wherein the third BS has a second signaling connection with the second BS, wherein the second signaling connection comprises at least one of a radio resource control (RRC) signaling connection, or a F1 control plane (F1-C) signaling connection.

21. The apparatus of claim 15, wherein the backhaul routing path carries at least one F1 control-plane (F1-C) traffic, F1 user-plane (F1-U) traffic, or non-F1 traffic.

22. The apparatus of claim 15, wherein the backhaul routing path carries traffic for a child user equipment (UE) of the third BS or a child integrated access backhaul (IAB) node mobile termination (MT) of the third BS.

23. The apparatus of claim 15, wherein the backhaul routing path carries traffic for a descendant user equipment (UE) of the third BS or a descendant integrated access backhaul (IAB) node mobile termination (MT) of the third BS.

24. The apparatus of claim 15, further comprising a transceiver or an antenna coupled to the at least one processor, wherein the first BAP configuration is uplink specific, downlink specific, or bidirectional.

25. The apparatus of claim 15, wherein the at least one processor is further configured to:

transmit, to the third BS or at least one other BS on the backhaul routing path, a second BAP configuration in association with the communicated first BAP configuration.

26. A method of wireless communication at a second base station (BS), comprising:

receiving a request from a first BS to configure a backhaul routing path via the second BS to a third BS that has a signaling connection to the first BS;

communicating, with the first BS, a first backhaul adaptation protocol (BAP) configuration associated with the backhaul routing path by:

receiving at least a first part of the first BAP configuration from the first BS; or transmitting at least a second part of the first BAP configuration to the first BS; and transmitting, for the third BS, a packet for routing along the backhaul routing path based on the request.

27. The method of claim 26, wherein the first BAP configuration comprises at least one of a BAP routing identifier (ID) of the backhaul routing path, a BAP path ID of the backhaul routing path, a BAP address of the third BS, a BAP address of a parent node of the third BS on the backhaul routing path, a BAP address of the second BS on the backhaul routing path, a backhaul radio link control (RLC) channel ID of a backhaul RLC channel between the third BS and the parent node of the third BS on the backhaul routing path, or a logical channel ID (LCID) of the backhaul RLC channel between the third BS and the parent node of the third BS on the backhaul routing path.

28. The method of claim 26, wherein the second BAP configuration comprises at least one of:

an uplink mapping to a BAP routing identifier (ID) of the first BAP configuration;

an uplink mapping to an egress backhaul radio link control (RLC) channel with a backhaul RLC channel ID or logical channel ID (LCID) of the first BAP configuration;

a routing configuration of the BAP routing ID of the first BAP configuration to an egress link;

a routing configuration to a next-hop BAP address of the first BAP configuration for a parent node of the third BS on the backhaul routing path;

a backhaul RLC channel mapping configuration from an ingress backhaul RLC channel with the backhaul RLC channel ID or the LCID of the first BAP configuration to the egress backhaul RLC channel;

a backhaul RLC channel mapping configuration from the ingress backhaul RLC channel to the egress backhaul RLC channel with the backhaul RLC channel ID or the LCID of the first BAP configuration; or an allocation of Internet protocol (IP) address information to the third BS and a BAP address of the first BAP configuration for the second BS on the backhaul routing path.

* * * * *